(12) United States Patent
Hendel et al.

(10) Patent No.: US 9,903,179 B2
(45) Date of Patent: Feb. 27, 2018

(54) ENHANCED HYDROCARBON WELL BLOWOUT PROTECTION

(71) Applicants: Rudolf H. Hendel, Summit, NJ (US);
Catherine G. Lin-Hendel, Summit, NJ (US)

(72) Inventors: Rudolf H. Hendel, Summit, NJ (US);
Catherine G. Lin-Hendel, Summit, NJ (US)

( * ) Notice: Subject to any disclaimer, the term of this patent is extended or adjusted under 35 U.S.C. 154(b) by 0 days.

(21) Appl. No.: 15/267,561

(22) Filed: Sep. 16, 2016

(65) Prior Publication Data

US 2017/0002626 A1      Jan. 5, 2017

Related U.S. Application Data

(63) Continuation of application No. 14/740,399, filed on Jun. 16, 2015, now Pat. No. 9,624,746, which is a continuation of application No. 13/151,669, filed on Jun. 2, 2011, now Pat. No. 9,057,243.

(60) Provisional application No. 61/350,803, filed on Jun. 2, 2010, provisional application No. 61/352,385, filed on Jun. 7, 2010, provisional application No. 61/357,519, filed on Jun. 22, 2010, provisional application No. 61/362,055, filed on Jul. 7, 2010.

(51) Int. Cl.
| | |
|---|---|
| *E21B 34/08* | (2006.01) |
| *E21B 33/064* | (2006.01) |
| *E21B 43/01* | (2006.01) |
| *E21B 33/035* | (2006.01) |
| *E21B 34/06* | (2006.01) |
| *E21B 21/10* | (2006.01) |
| *F16K 15/03* | (2006.01) |

(52) U.S. Cl.
CPC .............. *E21B 34/08* (2013.01); *E21B 21/10* (2013.01); *E21B 33/035* (2013.01); *E21B 33/064* (2013.01); *E21B 34/06* (2013.01); *E21B 43/0122* (2013.01); *F16K 15/033* (2013.01)

(58) Field of Classification Search
CPC .... E21B 33/035; E21B 33/037; E21B 33/064; E21B 33/068; E21B 33/076; E21B 34/06; E21B 34/08; E21B 43/0122
See application file for complete search history.

(56) References Cited

U.S. PATENT DOCUMENTS

| | | | | | |
|---|---|---|---|---|---|
| 2,204,340 | A | * | 6/1940 | Bradshaw | E21B 21/10 137/515.5 |
| 2,532,341 | A | * | 12/1950 | Shannon | E21B 33/037 166/96.1 |
| 2,897,895 | A | * | 8/1959 | Ortloff | E21B 33/0422 166/75.14 |
| 2,946,386 | A | * | 7/1960 | Jones | E21B 33/06 166/75.13 |
| 3,247,672 | A | * | 4/1966 | Johnson | B63C 11/44 166/351 |

(Continued)

*Primary Examiner* — Matthew R Buck
(74) *Attorney, Agent, or Firm* — Douglas L. Weller

(57) ABSTRACT

A system for enhancing well safety comprises a pipe equipped with a one-way check valve preventing hydrocarbon up flow through the well casing pipe. The one-way check valve opens in response to encountering downward pressure from downward insertion of fluid or objects moving downward towards a well reservoir. The one-way check valve closes in response to encountering upward pressure from fluid from the well reservoir.

19 Claims, 26 Drawing Sheets

(56) References Cited

U.S. PATENT DOCUMENTS

| | | | | |
|---|---|---|---|---|
| 3,603,385 A * | 9/1971 | Jones | | E21B 41/08 166/336 |
| 3,783,942 A * | 1/1974 | Mott | | E21B 21/10 166/323 |
| 4,147,221 A * | 4/1979 | Ilfrey | | E21B 7/128 166/339 |
| 4,161,222 A * | 7/1979 | Pye | | E21B 21/16 175/66 |
| 4,334,584 A * | 6/1982 | Magill | | E21B 7/12 175/171 |
| 4,456,071 A * | 6/1984 | Milgram | | E21B 43/0122 166/356 |
| 4,478,279 A * | 10/1984 | Puntar | | E21B 21/10 166/121 |
| 4,558,744 A * | 12/1985 | Gibb | | E21B 7/185 166/222 |
| 4,568,220 A * | 2/1986 | Hickey | | E21B 43/0122 166/338 |
| 4,712,613 A * | 12/1987 | Nieuwstad | | E21B 21/10 166/187 |
| 4,983,803 A * | 1/1991 | Pringle | | B23H 7/02 219/69.12 |
| 5,176,471 A * | 1/1993 | Frafjord | | E21B 33/037 166/356 |
| 5,713,389 A * | 2/1998 | Wilson, Jr. | | E21B 34/06 137/515.7 |
| 5,819,853 A * | 10/1998 | Patel | | E21B 34/063 166/319 |
| 6,352,114 B1 * | 3/2002 | Toalson | | E21B 17/01 166/339 |
| 6,375,155 B1 * | 4/2002 | Janssens | | F16L 55/10 251/212 |
| 6,488,093 B2 * | 12/2002 | Moss | | E21B 19/22 166/339 |
| 6,520,262 B2 * | 2/2003 | Barnett | | E21B 33/076 166/339 |
| 6,820,695 B2 * | 11/2004 | Stevens | | E21B 21/10 166/242.8 |
| 7,021,385 B2 * | 4/2006 | Ohmer | | E21B 21/10 166/322 |
| 7,252,152 B2 * | 8/2007 | LoGiudice | | E21B 17/1028 166/177.4 |
| 7,475,732 B2 * | 1/2009 | Hosie | | E21B 21/08 166/373 |
| 7,617,879 B2 * | 11/2009 | Anderson | | E21B 21/10 166/242.4 |
| 8,807,223 B2 * | 8/2014 | Smith | | E21B 33/076 166/335 |
| 9,057,243 B2 * | 6/2015 | Hendel | | E21B 33/064 |
| 2007/0215356 A1 * | 9/2007 | Leeb | | E21B 21/10 166/325 |
| 2008/0289878 A1 * | 11/2008 | Livingstone | | E21B 21/103 175/318 |
| 2010/0018714 A1 * | 1/2010 | Merlau | | E21B 23/04 166/319 |
| 2010/0147526 A1 * | 6/2010 | Haughom | | E21B 7/124 166/338 |
| 2011/0274493 A1 * | 11/2011 | Cutts | | E21B 43/0122 405/60 |
| 2012/0279603 A1 * | 11/2012 | Swist | | E21B 33/06 138/109 |

* cited by examiner

ENHANCED HYDROCARBON WELL BLOWOUT PROTECTION

RELATED APPLICATIONS

The present application is a continuation application of non-provisional patent application Ser. No. 14/740,399 filed on Jun. 16, 2015, which is a continuation of non-provisional patent application Ser. No. 13/151,669 filed on Jun. 2, 2011, which claims the benefit of the following prior filed provisional applications: provisional application No. 61/350,803, filed on Jun. 2, 2010; provisional application No. 61/352,385, filed on Jun. 7, 2010; provisional application No. 61/357,519, filed on Jun. 22, 2010; provisional application No. 61/362,055, filed on Jul. 7, 2010; each of which is hereby incorporated in their entirety by reference.

BACKGROUND

High pressure gas and oil deposits underground can explode through an oil well, gushing oil and gas into the environment, causing explosions killing people, and inflicting tremendous damages to the environment and wild life. Such risks to human and environment though not limited to off-shore wells are particularly severe and difficult to manage at deep ocean off-shore sites. Case in point is the Deepwater Horizon drilling rig explosion that occurred Apr. 20, 2010 at the Macondo prospect oil field in the Gulf of Mexico. The explosion resulted in the sinking of the rig, 4.9 million barrels of crude oil spewed into the ocean, 50 billion cubic feet of methane gas spewed into the environ, and 2 million barrels of dispersants injected into the sea. Many estimated that the Deepwater Horizon disaster has caused damages in the order of a hundred billion US Dollars, and inestimable further damages yet to unfold.

A conventional blowout preventer (BOP) used in hydrocarbon wells is a costly and massive contraption. The one used at the Macondo Well of the Deepwater Horizon disaster was about 53' high×16'×16' wide and weighing 300 tons. It is installed atop a well head with an approximately 36" flange connection to a well pipe about 20" in diameter. A blowout preventer is a complex multiple-stage pipe-shearing and ramming device powered by batteries, controlled electrically via electrical wiring and electronic communications circuitry between the blowout preventer and the drilling rig, all of which may fail when encountering hostile conditions such as fire, explosion, blowout, and human error. In the case of the Deepwater Horizon disaster, the blowout preventer's electrical components failed at the very beginning. Attempts to mechanically activate the pipe-shearing and pipe-ramming devices using deep-sea robots also failed because the drill pipe remaining in the blowout preventer jammed these devices. In addition, the blowout preventer was listing 12 to 16 degrees risking a catastrophic toppling. Postmortem examination of the blowout preventer showed extensive corrosion. There was no access to the well head and the well below the blowout preventer, and no means to remove the damaged blowout preventer before the well was sealed through a five month long conventional "bottom kill" procedure, during which a relief well was drilled to access the bottom of the problem well to plug it. If the casing system of the well is compromised, stemming the blowout hydrocarbon flow at or above blowout preventer would result in high pressure hydrocarbon breaching grounds below the sea floor and escaping through the sea floor.

Conventional remedial methods were tried and failed during the many months following the Deepwater Horizon drilling rig explosion. During that time, the oil spilled and the dispersant released into the Gulf of Mexico traveled wide with the gulf current, causing disastrous environmental and commerce damages. The conventional methods tried and failed included the use of coffered domes and top hats which are massive up-side-down funnels with a riser pipe at the top that were lowered over the hydrocarbon spewing broken pipe sections in hope of capturing the spewing hydrocarbon. Unfortunately frozen hydrate formed to block the riser pipe.

Another method that was tried and failed was the insertion of a thinner good pipe into the damaged pipe section in an attempt to capture some of the oil and gas flow. Unfortunately, the hydrocarbon pressure enlarged the broken gap at the pipe section near the top of the blowout preventer and spewed out there instead.

Another method that was tried and failed was the pumping golf balls, tire shreds, ropes, knots, and other junk and mud into the blowout preventer, hoping to plug the pipe in the blowout preventer to stem the massive hydrocarbon flow. Unfortunately, the high pressure hydrocarbon flow spewed out the junk with it.

Another method that was tried and failed was a hat-like contraption, called a lower marine riser package (LMRP), with a wide open bottom and a pipe at the top. This was placed loosely fitting over the cut pipe opening at the top of blowout preventer, hoping to catch some of the spewing hydrocarbon. Unfortunately, more than 75% of the spewing hydrocarbon was reflected off the hat-top of the LMRP and ejected down into the surrounding ocean.

SUMMARY

Protection at a hydrocarbon well is enhanced by placing a blowout preventer over a well head. An adapter is connected to the blowout preventer. The adapter includes a valve that when turned off prevents non-production flow from the blowout preventer to a riser pipe.

DESCRIPTION OF THE EMBODIMENTS

This description herein incorporates by reference all the subject matter disclosed in provisional application No. 61/350,803, filed on Jun. 2, 2010; provisional application No. 61/352,385, filed on Jun. 7, 2010; provisional application No. 61/357,519, filed on Jun. 22, 2010; provisional application No. 61/362,055, filed on Jul. 7, 2010.

Hydrocarbon well safety is enhanced by protecting a blowout preventer, and its connection to a riser pipe and a well head. In various embodiments, infrastructure is anchored to protect well components and to deploy assembly and operations. A flange sealable capping and hydrocarbon capturing pipe adaptor is used to cap an oil and gas spewing BOP and capture the hydrocarbon flow, a sealing plug with a sealable pipe adaptor is used to seal a broken pipe sits atop the BOP and to capture the spewing blowout hydrocarbon flow. A base-plate is mounted on the sea floor to protect the well head and anchor the BOP. A containment and protection chamber with a venue for hydrocarbon extraction is mounted on the base plate. A safer and more effective blowout preventer is presented that replaces a conventional blowout preventer. A multi-port branched pipe-adapter (MPBPA) can be mounted above and below a blowout preventer to improve well access and safety, and to capture hydrocarbon flow in case of a blowout event. A MPBPA enables full collection of the blowout hydrocarbons while conducting well monitoring, inspection, repair, plugging, or "bottom killing" the well from the well through the MPBPA after a blowout event.

Pre-event fabrication and installation of devices and apparatus described in this disclosure will enhance well safety, help prevent blowout events, enable quick and effective remedial responses, and minimize risks and damages from a blowout event. Additional benefits include prevention of accidental damages or unauthorized access to the blowout preventer, well head, and wellbore, securing wellbore access regardless of the blowout preventer condition, the ability to remove and replace a problematic blowout preventer, and the ability to separately capture and collect methane gas from oil.

The concepts illustrated herein are extendable by those skilled in the arts to a multitude of variations, combinations and applications in the oil and gas industry including exploration, production, and service and maintenance operations not specifically discussed in this application.

Disclosed embodiments are applicable to all phases of a well creation and operations. Even though the embodiments are illustrated with a vertically drilled off-shore well, many disclosed elements are also suited for non-vertically drilled wells and on shore wells.

Figure 1:
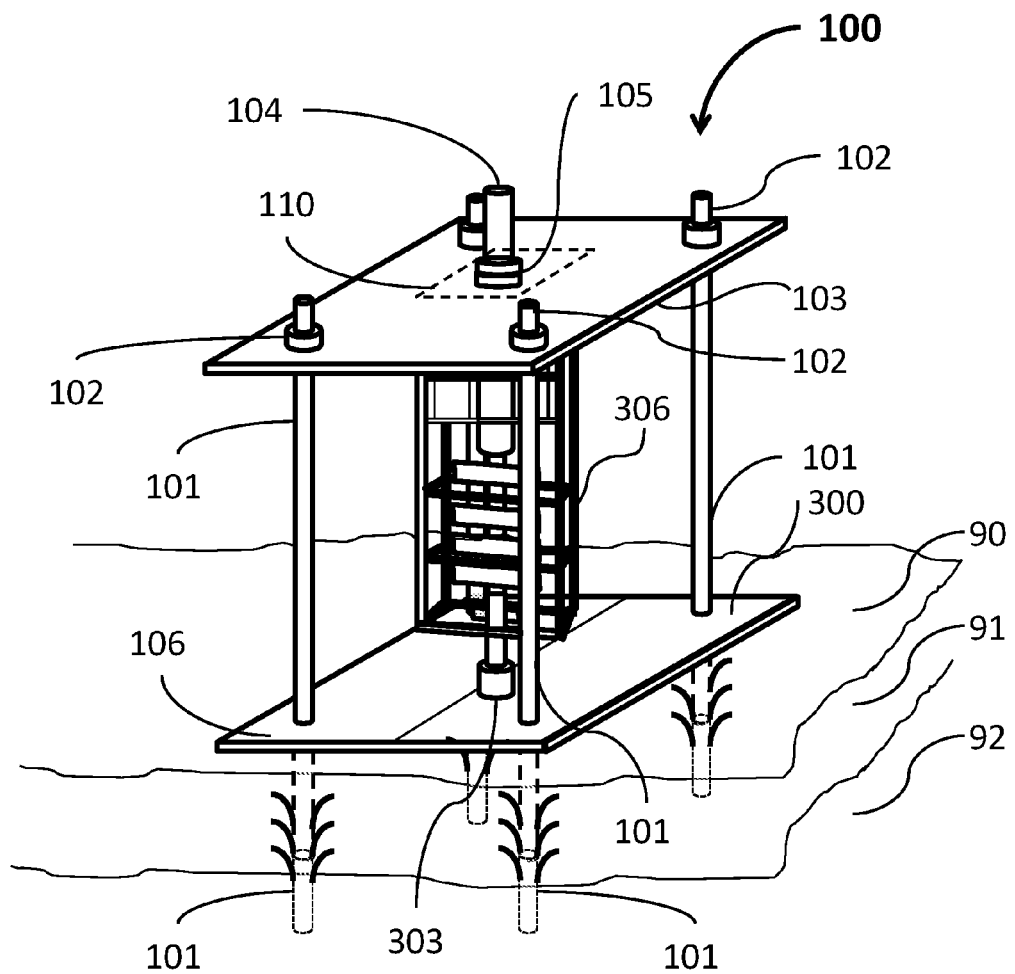
FIG. 1 shows an anchoring infrastructure for a blowout preventer with piers drilled into bedrock in accordance with an embodiment of the disclosure.

FIG. 1 shows an anchoring infrastructure for a blowout preventer 306. To form an anchoring infrastructure 100, anchoring piers 101 are driven into the sea floor 90 through a sediment layer 91 into bedrock 92 at a suitable distance from a well. Mounting and positioning devices 102 mount a platform 103 onto anchoring piers 101 to support and protect well components or to deploy various assemblies or well operations. Anchoring infrastructure 100 also serves to position and align the assembly that includes blowout preventer 306, platform 103, pipes, various apparatus and components in anchoring infrastructure 100.

For pre-event installation, platform 103 incorporates a via for connecting BOP 306 to a riser pipe 104. A BOP to riser pipe flange and clamp 105 is mounted above a blowout preventer 306 and platform 103. A flange mounted flexible pipe section 210 can be mounted below riser pipe 104 and on top a sealable hydrocarbon capturing pipe adaptor (SHCPA) 200 as described in FIG. 3 or a MPBPA 500 as described in FIG. 18, which is mounted to the top flange of BOP on top platform 103. Platform 103 anchors well components above it, and protects well components below it including blowout preventer 306, and well head 303.

If riser pipe 104 falls with a sinking rig, as occurred during the Deepwater Horizon disaster, riser pipe 104 may break anywhere between the rig (not shown) and the flexible pipe section, or at worst at the component immediately above platform 103. The flexible pipe section cushions the drag from the fallen riser pipe and protects SHCPA 200 or MPBPA 500. Platform 103 and everything below, including blowout preventer 306 are protected and most likely will remain intact. Alternately, platform 103 can be located immediately below the top flange of SHCPA 200 or MPBPA 500 connecting to the top of BOP 306, with only the flexible pipe and riser pipe above platform 103. If either flexible pipe 210 or riser pipe 104, or both are damaged, they can be easily removed and replaced.

Figure 10:
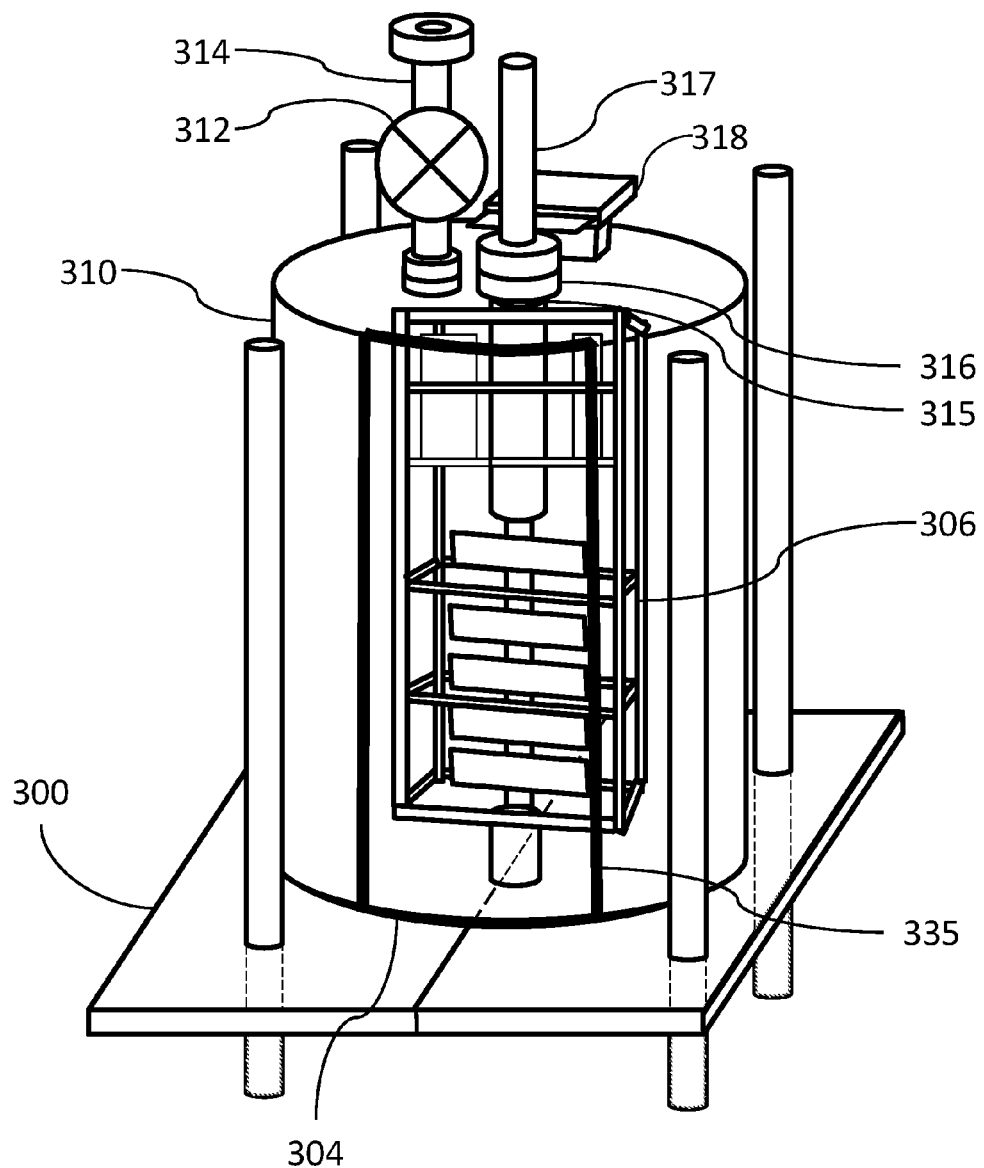
FIG. 10 shows a hydrocarbon containment and collection chamber in accordance with an embodiment of the present disclosure.

A well head protection base plate 300 is shown mounted at the sea floor level. A containment and protection chamber can be mounted on base plate 300, as illustrated in FIG. 10 where containment and protection chamber 310 is mounted on base plate 300. Containment and protection chamber 310 also serves to protect the well and to capture hydrocarbon flow leaking from the well in case of a blowout or an accident.

Figure 22:
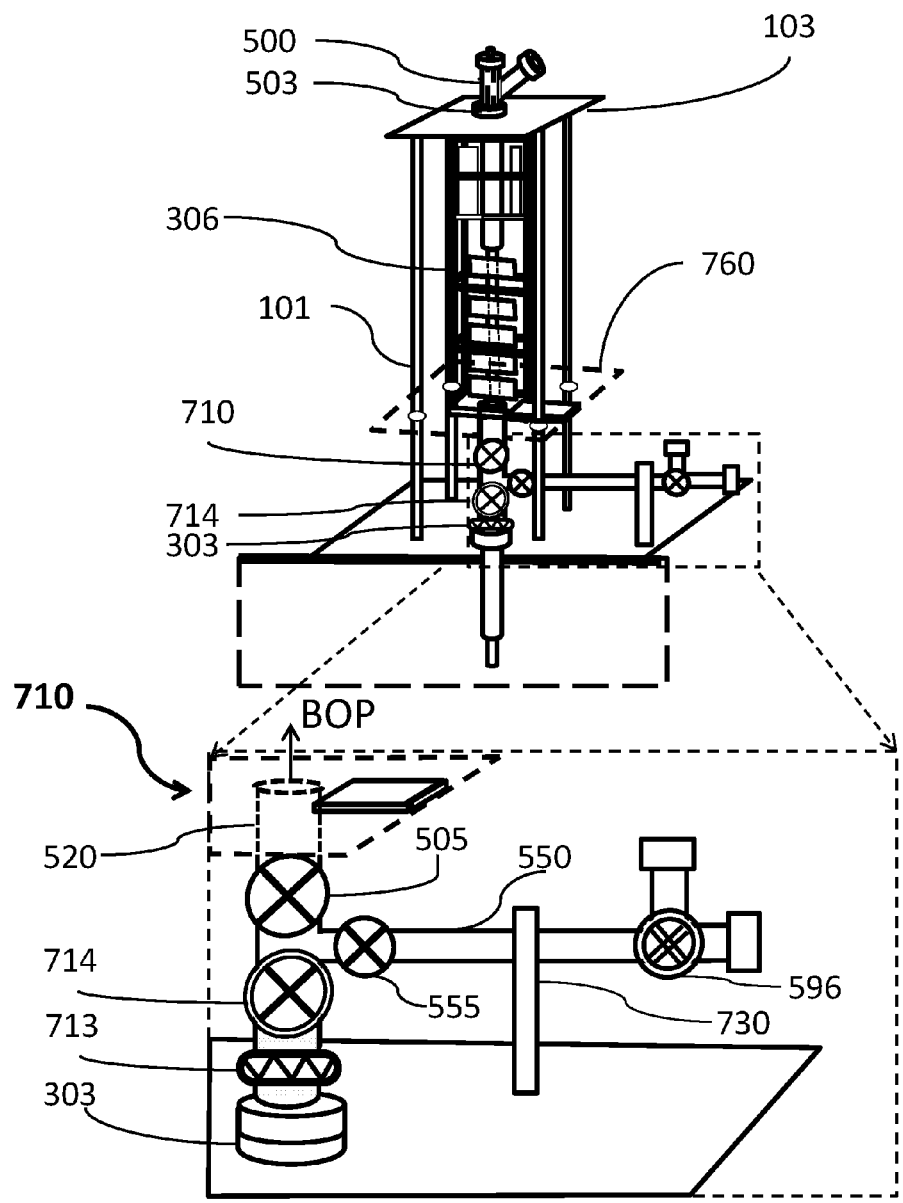
FIG. 22 and FIG. 23 show a multi-port branched pipe adaptor (MPBPA) mounted above, and below a blowout preventer in accordance with embodiments of the present disclosure.

A blowout preventer support framework can be mounted to anchor on base plate 300 and positioned immediately below blowout preventer 306 so that the weight of blowout preventer 306 sits on the framework. Alternately, the framework can be anchored to anchoring piers 101. This is illustrated in FIG. 22 where is shown a blowout preventer support and isolation framework 760 upon which a blowout preventer 306 sits.

As shown in FIG. 1, for example, platform 103 can be made with an apparatus mounting hole 110 used for mounting various devices and apparatus. This allows platform 103 to function as a general purpose operation launching counter-pressure platform as needed for deploying and mounting devices or apparatus used in response to a high pressure blowout hydrocarbon flow. For example, operations utilizing platform 103 might include an operation to cap and capture the blowout hydrocarbon flow, an operation to squeeze shut or cut off damaged riser pipe, an operation to mount an encapsulation or containment and protection chamber to enclose the well and contain and capture leaking hydrocarbon flow, an operation to remove pipes stuck in the blowout preventer, and an operation to mount an assembly driving string for launching sensors, plugs, and repair assembly into the well.

Figure 2:
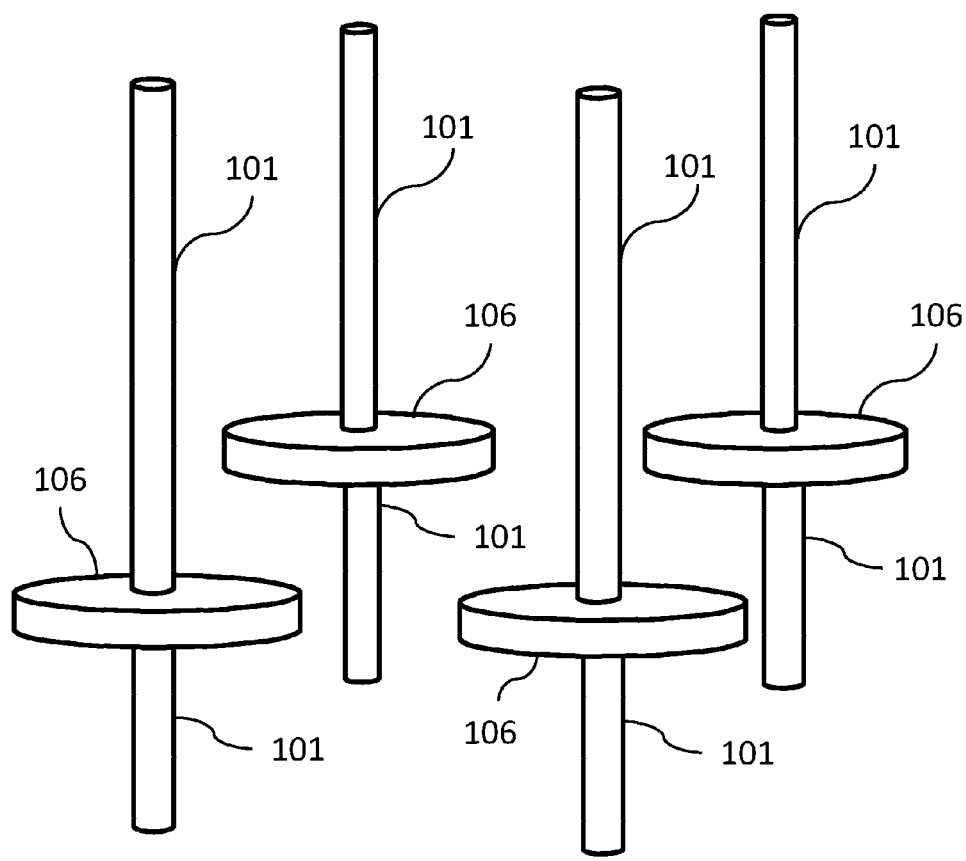
FIG. 2 shows an alternate example of anchoring piers with pier-anchoring discs that anchor the piers in case the location has deep sediment or uneven sea floor.

FIG. 2 shows additional detail of pier anchoring discs 106 located at sea floor 90 where piers 101 penetrate sea floor. Pier anchoring discs 106 have through-holes through which piers 101 are driven into the sea floor 90. Pier anchoring discs 106 help anchor piers 101, reducing the depth into which piers 101 need to be driven into the sea floor 90. These pier anchoring discs are especially helpful when the sediment layer is deep, or when the geography around the well head is not flat over an adequately large area.

Figure 3:
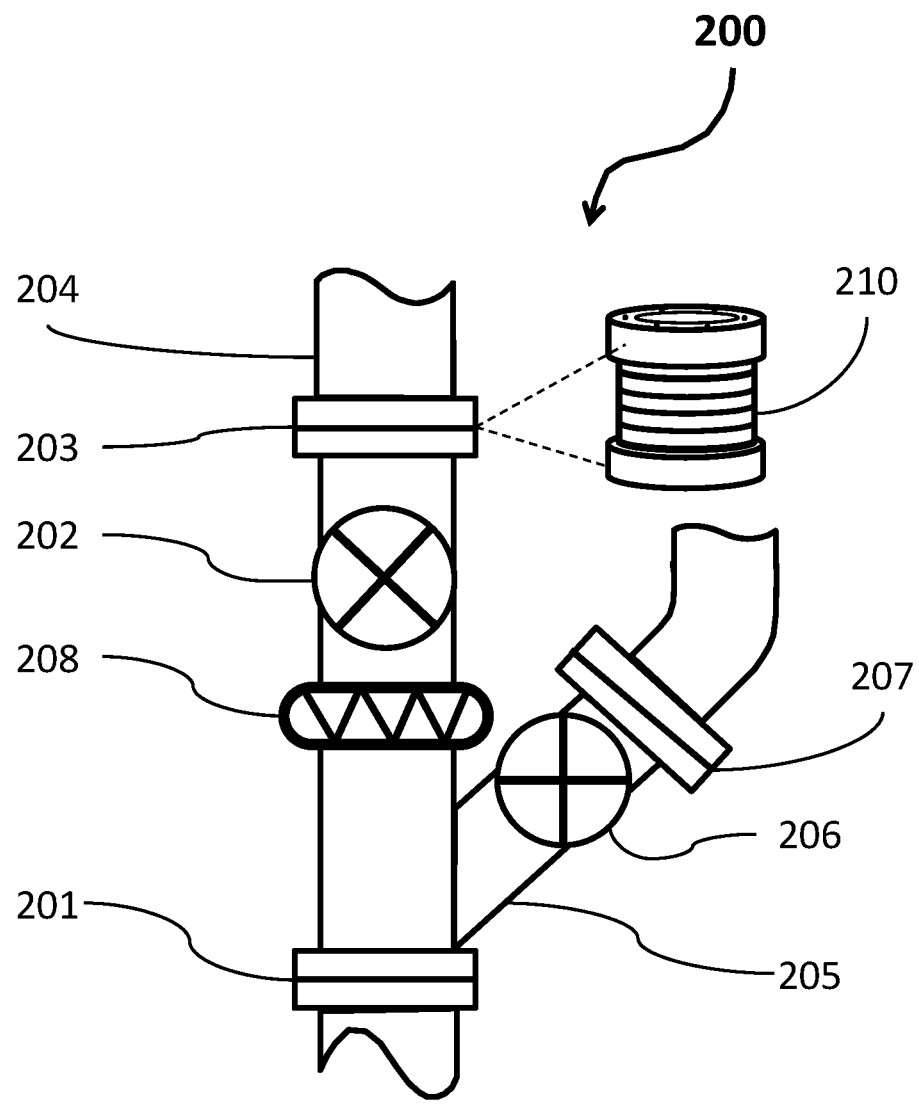
FIG. 3 and FIG. 4 show a flange sealable capping and flow capturing device, sealable hydrocarbon capturing pipe adaptor (SHCPA) with a tubular body and flange connectors, an optional flow control valve, and an optional side branch adaptor in accordance with embodiments of the disclosure.
Figure 4:
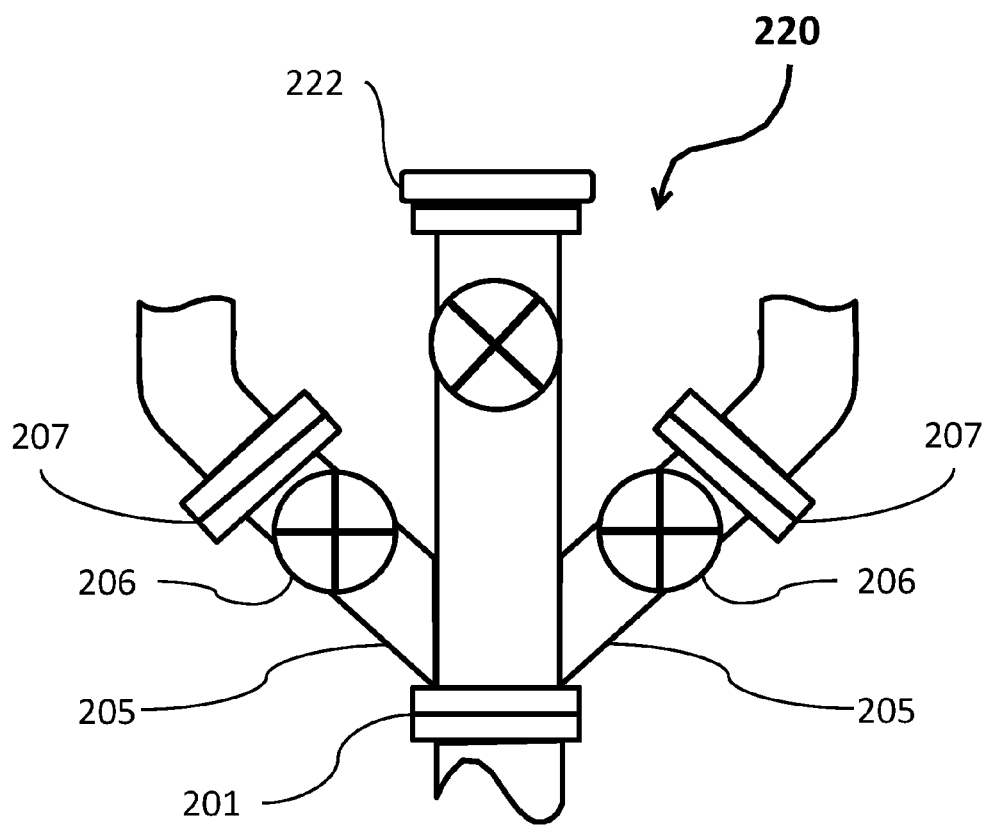

FIG. 3 shows a sealable hydrocarbon capturing pipe adaptor (SHCPA) 200 that can be used for capping a problem well leaking from above the blowout preventer, and to collect and harvest the hydrocarbon flow to a collection facility. Sealable hydrocarbon capturing pipe adaptor SHCPA 200 has a flange 201 for connecting to blowout preventer 306. A flange 203 allows connection to a hydrocarbon collection pipe 204 or a riser pipe containing a hydrocarbon collection pipe. An optional flow control valve 202 can be included to provide additional operational flexibility. At least one branch can be added to SHCPA 200. The top of SHCPA 200 can be capped, as shown in FIG. 4, which also shows 2 side branches. More than 2 branches can be added.

In a normal operation of an oil well there should never be hydrocarbon presence in the well space outside of a production pipe. Hydrocarbon presence there is a rogue hydrocarbon presence and indicates trouble. The legitimate fluids in this space are drilling fluids (also called drilling mud), sea water and occasionally cement slurry. This space includes the casing pipe string below the well head, the BOP core, and the riser pipe outside of the production pipe within. Before the production pipe is installed, there should be no hydrocarbon presence in the well all the way from the low end of the casing pipe through the BOP and riser pipe up to the rig. When sensing a hydrocarbon up flow from the bottom of the well—which pushes drilling fluid up at the top end, more drilling mud must be pumped down to increase counter pressure to expel the rogue hydrocarbon back down to the reservoir. During drilling phase, a relatively small diameter drill pipe string (passing through the center of a riser pipe, the BOP tubular core, and the casing pipe) pumps down drilling fluid into the well bore to cool the drill head attached to the drill pipe through a collar at the bottom end of the drill pipe and circulate the formation debris such as rocks, sand and soil up with the drilling fluid through the well bore, the casing pipe, the BOP tubular core and the riser pipe, to the drilling rig. The debris is filtered out, and the drilling fluid re-circulated down to the well bore. During the drilling process, the well bore size is progressively reduced and progressively smaller diameter casing pipe strings are installed into the well bore to line the well and isolate the earth formation from the well. Typically, the last two layers of casing pipe strings reach the reservoir. The annular space between the layers and the core space of the inner most casing pipe are filled with drilling fluid. The bottom end of the annular space is sealed from the reservoir with cement. The bottom of the casing pipe is sealed from the reservoir with a "cement shoe." Heavy drilling fluid column inside the wellbore counter balances the hydrocarbon pressure in the reservoir. Above a safe level of drilling fluid column, sea water is used to fill the space. The production pipe is installed inside the inner most casing pipe during a "completion" process sometime after the drilling process is completed. The production pipe assembly goes from the rig, pass through the riser pipe, BOP core, through the center of the casing pipe down to the reservoir. During a production mode, the usually hot hydrocarbons are manipulated to flow up the production pipe to the rig at a controlled rate, which is production flow. Every other flow that happens in these pipes is a non-production flow. The annular space in the riser pipe, the BOP core, and the casing pipe outside the production pipe is filled with drilling fluid or sea water, and sometimes injected nitrogen gas to balance pressure and keep the well bore at an appropriate temperature range.

If sealable hydrocarbon capturing pipe adaptor SHCPA 200 is not installed pre-event, it can be mounted to blowout preventer 306 using an undersea robot such as a Remotely Operated Undersea Vehicle (ROV). Hydrocarbon collection pipe 204 can then be attached to flange 203. Flow control valve 202 is kept open through the process to minimize resistive pressure from the blowout flow.

Alternatively, sealable hydrocarbon capturing pipe adaptor SHCPA 200 can be attached to a riser pipe at sea level, and lowered with the riser pipe to blowout preventer 306 to make a flange-to-flange connection to blowout preventer 306 at flange 201 using an ROV. Flow control valve 202 can be kept open when attaching flange 201 to the blowout preventer flange to minimize resistive pressure from the blowout flow. The valve can be closed to stop the hydrocarbon flow when desirable—for example, when threat of storm mandates a connected rig or an oil storage ship to leave for safe harboring, or when an oil storage ship is full and ready to disengage.

An optional branch 205 with control valve 206 and collection pipe flange 207 can be added as an additional collection channel or as a diverting channel when desirable. For example, after sealable hydrocarbon capturing pipe adaptor SHCPA 200 is attached to blowout preventer 306, diverting the flow to side branch 205 helps clear the visibility and resistive pressure for attaching hydrocarbon collection pipe 204 to the assembly at flange 203. Another example is when a storage ship is to disengage and another ship engaged, the side branch can be used to divert the hydrocarbon flow to the new ship before valve 202 is shut off to disengage the first ship. Side branch adaptor 205 includes pipe connecting flange 207 and control valve 206. Multiple side branches are incorporated for operational needs and flexibility.

Figure 17:
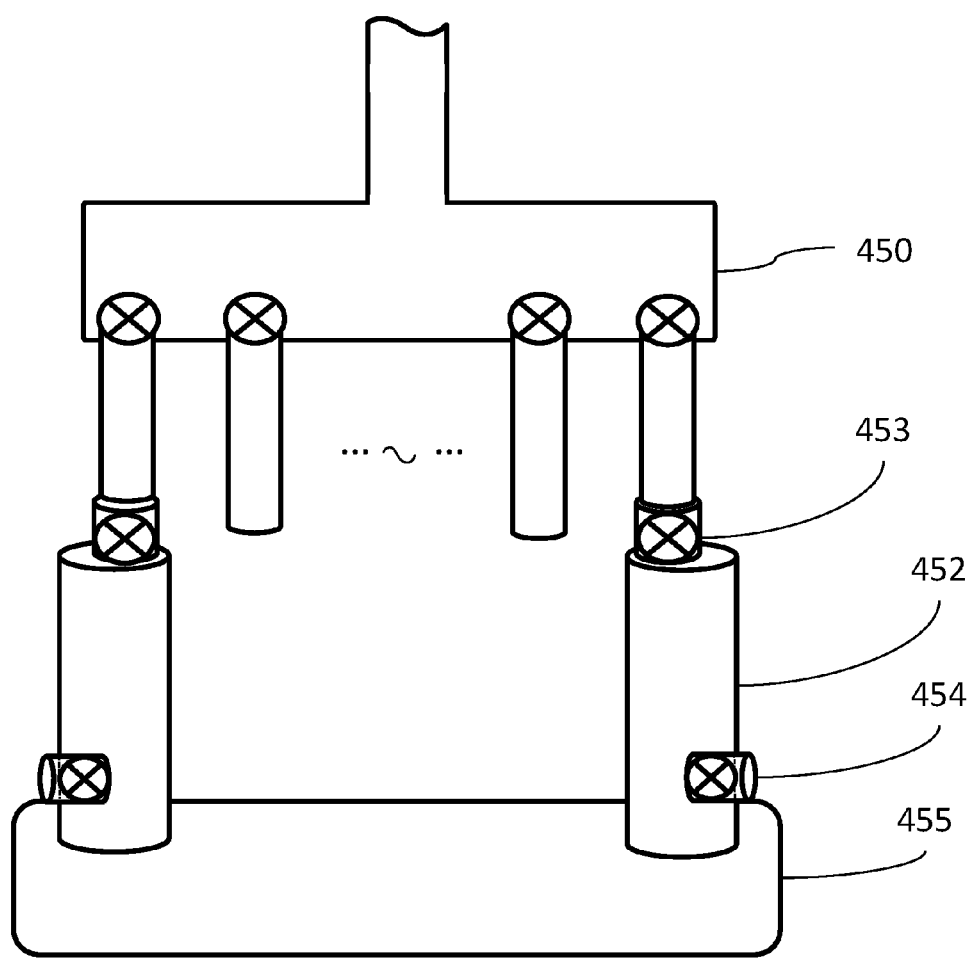

When SHCPA 200 is to be used for pre-event installation, a pressure or hydrocarbon sensor (or both), sensor assembly 208 is added to close control valve 202 when hydrocarbon presence is detected. The closing of control valve 202 will divert the rogue hydrocarbons to branch 205, which is further piped to a storage unit at seafloor while remedial action is sought, or to wait for a suitable time to transport to a collection facility at sea surface. A collection facility is any combination of the following: a ship, a tanker, a rig, a processing facility, a storage unit or a storage tank, or anything that collects. And it can be located at or near the sea surface (hence forth as at sea surface) or at or near sea floor (hence forth as at seafloor). A storage unit is any combination of the following: a storage tank (or multiple storage tanks), a storage tank without outlet, or a storage tank with an inlet and an outlet. The storage unit can be further equipped with a manifold as shown in FIG. 17 to fill a storage tank (or multiple storage tanks) of a size convenient for transport from seafloor to a collection facility at sea surface. Additional optional branches can be added to 205 to provide more functions. A flexible pipe section with top and bottom flange connectors can be added to SHCPA 200 as desired, for example, for the purpose of shock absorption or drag isolation.

Figure 5:
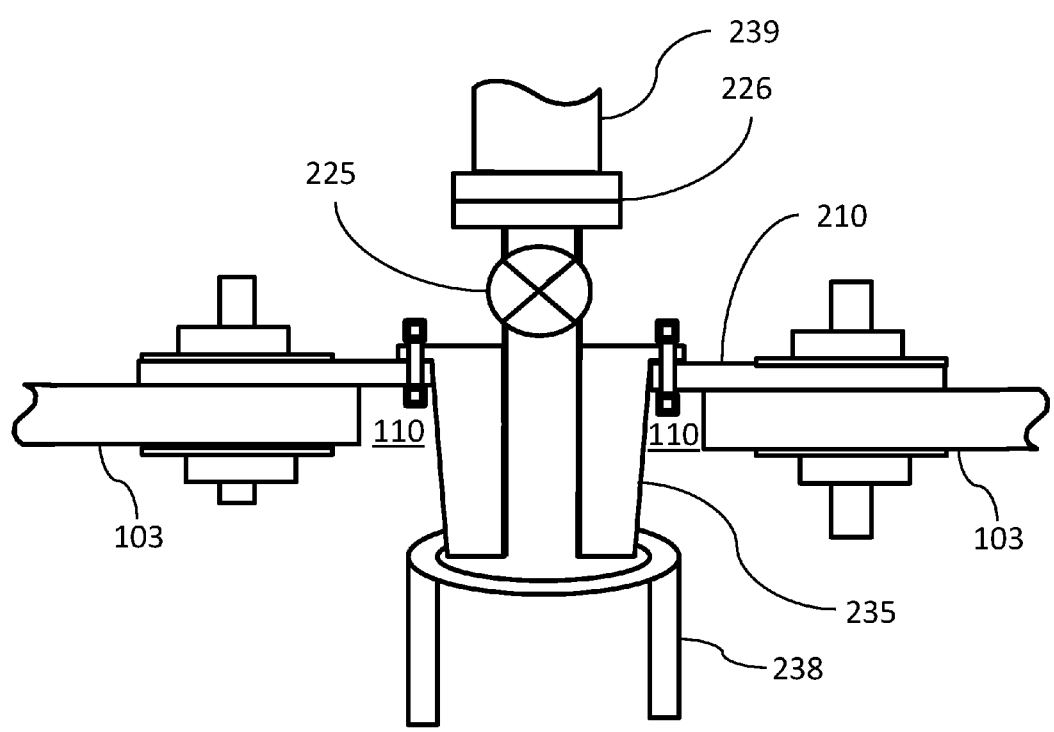
FIG. 5 shows a pipe plugging assembly with a flanged pipe adaptor and a flow-control valve in accordance with an embodiment of the disclosure.

If after a blowout event a damaged riser pipe is cut at above the blowout preventer and cannot be easily or safely removed from the blowout preventer, a plugging device, such as a pipe plug 235 shown in FIG. 5, can be used to plug the cut pipe, at least until the cut pipe is removed from blowout preventer 306.

As shown in FIG. 5, pipe plug 235 incorporates a flange 226 for connecting to a hydrocarbon collection pipe 239. Plug 235 can be used to plug a cut pipe 238, and capture hydrocarbon flow through hydrocarbon collection pipe 239 connected to flange 226. Pipe plug 235 can be used in conjunction with an optional assembly handling and counter pressure application accessory 210 to increase the area for handling pipe plug 235 and where force can be applied to help drive pipe plug 235 into the opening of cut pipe 238. When needed, the assembly handling accessory 210 can be mounted on the general purpose counter pressure platform 103 anchored to anchoring infrastructure 100 shown in FIG. 1. A flow control valve 225 controls the hydrocarbon flow, and hydrocarbon collection pipe 239 connected to flange 226 harvests hydrocarbon flow to a storage ship, a storage terminal, or a temporary storage unit at seafloor. When and if the ship has to disengage, flow control valve 225 can be closed off if so desired. Flow control valve 225 also enables controlled pressure relief during and after the plugging process.

Figure 6:
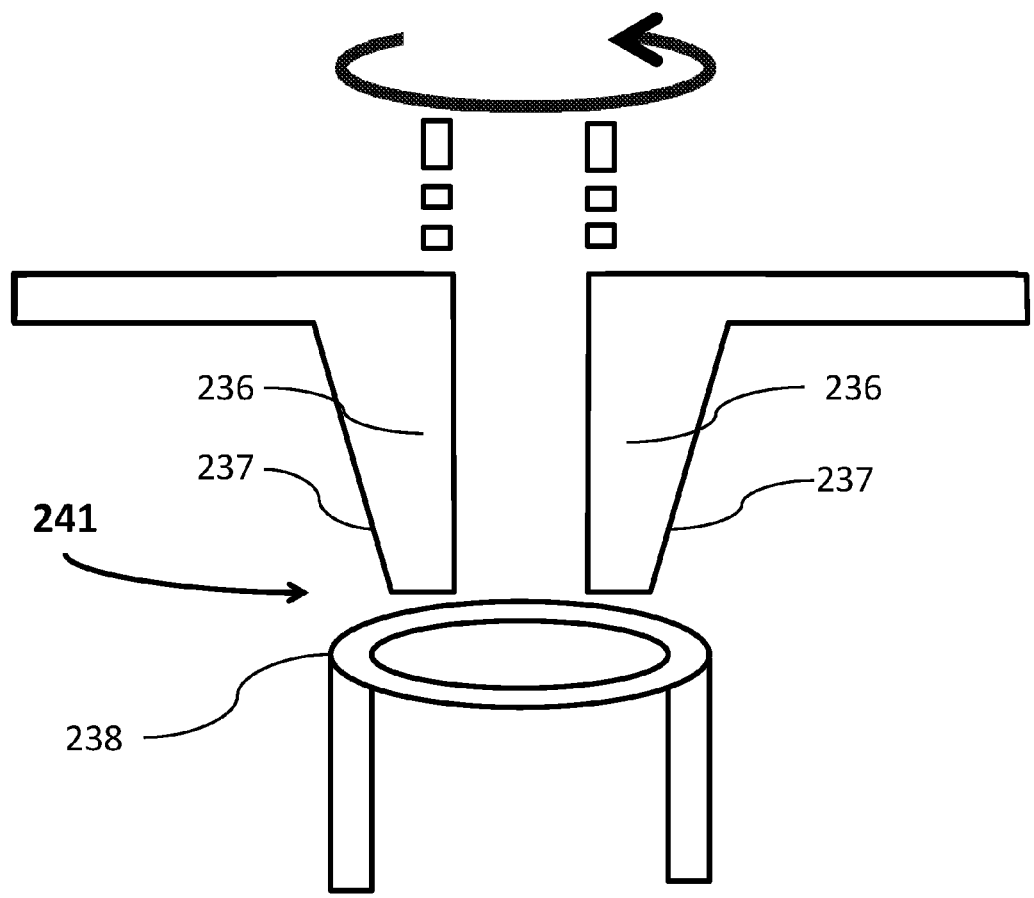
FIG. 6 and FIG. 7 show use of a reaming device to ream a smooth sealable surface in the pipe that mates with the plug shown in FIG. 5 in accordance with an embodiment of the disclosure.
Figure 7:
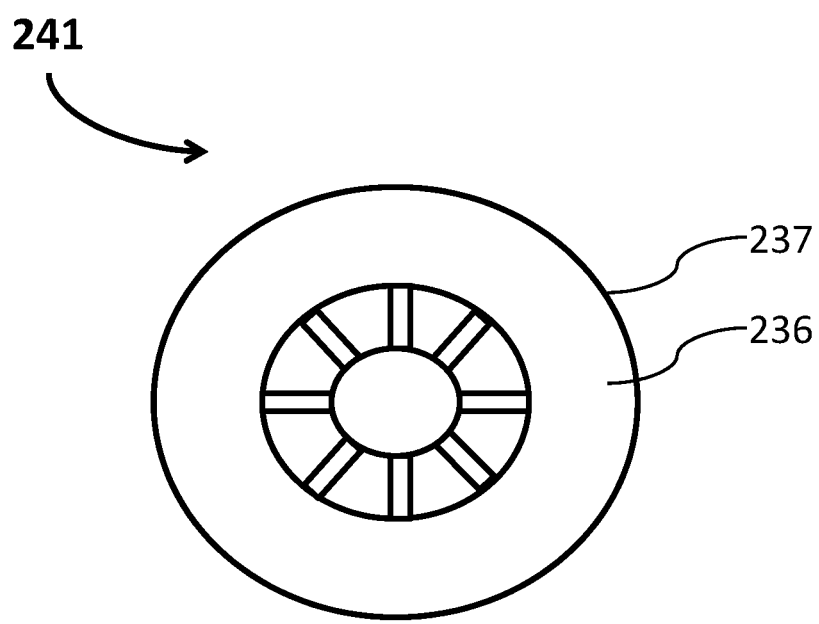

A pliable pipe sleeve lined with pliable sealing material can be used to make a sealed joint between sealable hydrocarbon capturing pipe adaptor SHCPA 200 shown in FIG. 3 and cut pipe 238. A reamer 241 can be used to generate a smooth sealable plug-mating surface at the opening of cut pipe 238, as illustrated in FIG. 6 and FIG. 7. FIG. 6 shows a side cross sectional view and FIG. 7 shows a top cross-sectional view of reamer 241 having a rotating cone 236 and an abrasive surface 237.

Figure 8:
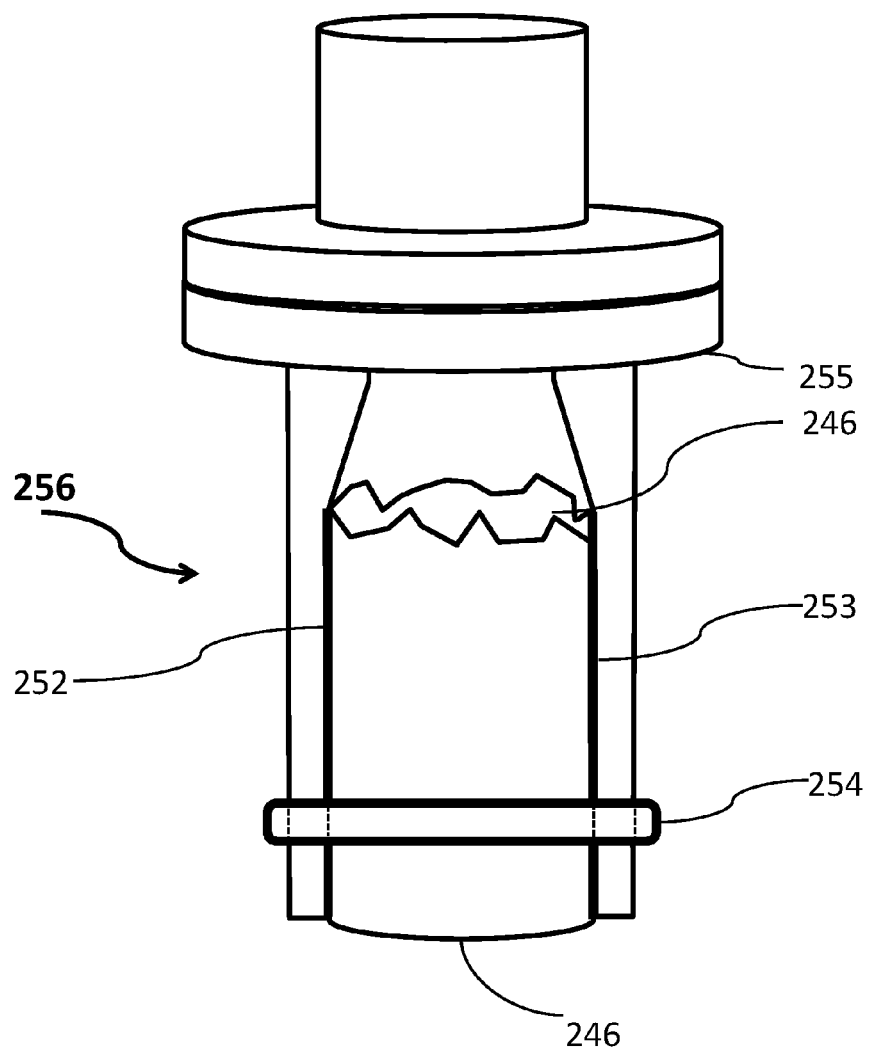
FIG. 8 shows a pipe sleeve lined with sealable elastomeric material used to make a sealed connection between the pipe and the capping device illustrated in FIG. 3 in accordance with an embodiment of the present disclosure.

FIG. 8 shows a pipe sleeve 256 lined with pliable material 252. For example, pliable material 252 is an elastomeric material reinforced with para-aramid synthetic fiber or some other pliable material with suitable chemical and physical characteristics. Pipe sleeve 256 is further equipped at the top with a flange connector 255 to form a sealed connection with the bottom flange 201 of sealable hydrocarbon collection pipe adaptor SHCPA 200. A pipe fastener 254 is used for tightening pipe sleeve 256 to cover and seal an imperfect pipe 246. A slightly angled cone surface 253 facilitates a tight seal.

Figure 9:
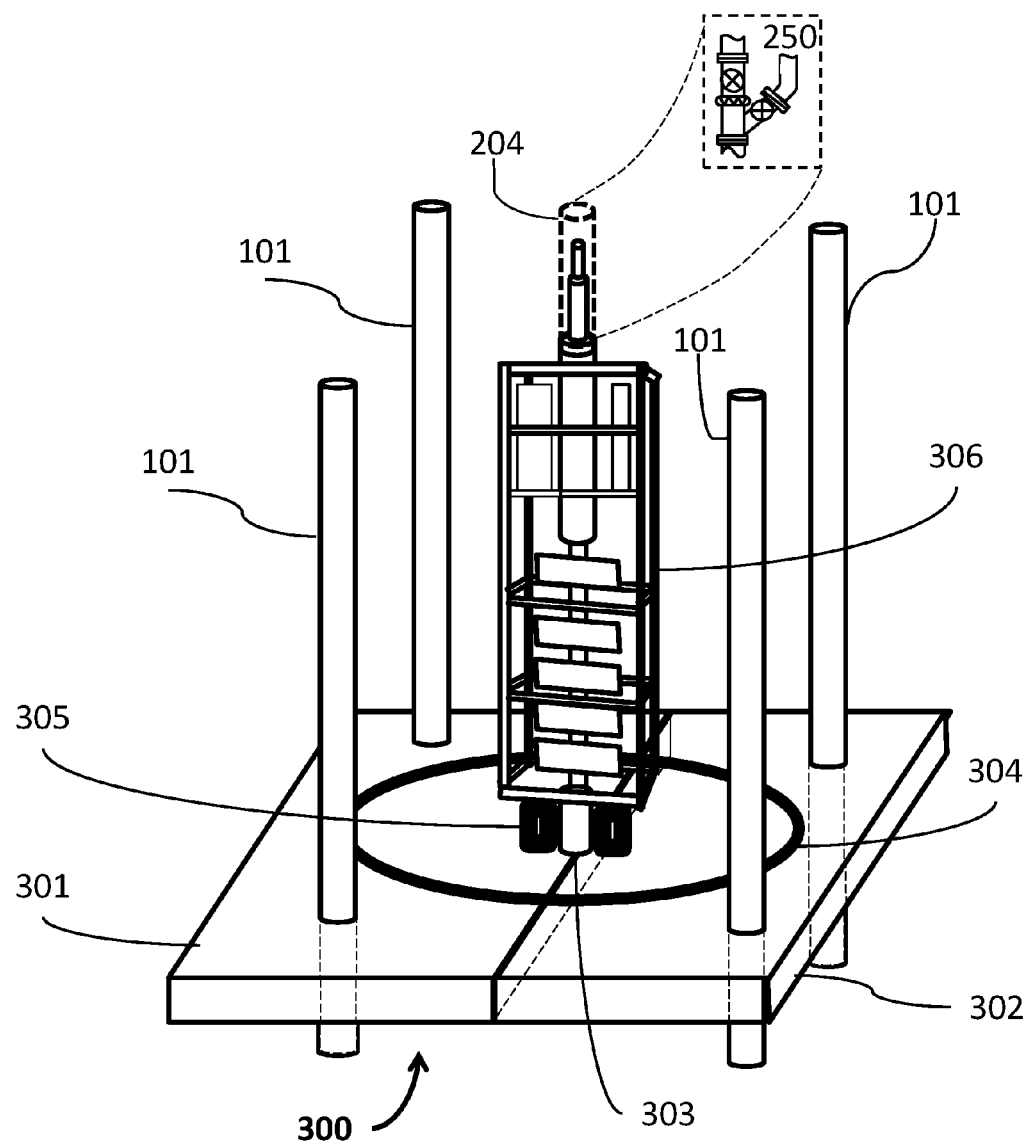
FIG. 9 shows a well head protection base plate composed of two self-sealing half plates installed at a well head at the sea floor level in accordance with an embodiment of the present disclosure.

As shown in FIG. 9, whole base plate 300 is formed, for example, from half plates 301 and 302 tongue-in-grooved to form an oil sealed connection with each other. Base plate 300 is installed on the sea floor to surround and protect well head 303. Base plate 300, with its large horizontal surface resting on the seafloor is self anchoring. Additionally, through-holes can be added to the base plate to accommodate anchoring piers to drive through these holes into the sea floor to help anchoring the piers. As shown in FIG. 1, base plate 300 and anchoring piers 101 which are driven through holes in 300 into the base rock mutually anchoring one another's stability. Alternately, base plate 300 can be an independent anchoring apparatus. A sealing groove 304 supports a full enclosure containment and protection chamber. A two-piece well head brace 305 forms an oil tight seal with base plate 300 around well head 303. Well head brace 305 is inserted into a center well-head through-hole of base plate 300 to brace well head 303. Well head brace 305 can be removed for well head inspection. In a conventional well, blowout preventer 306 is mounted directly on top of well head 303 without benefit of a support structure. Base plate 300 can anchor and support a frame work upon which blowout preventer 306 sits. Independent of anchoring infrastructure, SHCPA 200 described in FIG. 3 can be inserted between BOP 306 and riser pipe 204 as shown in 250, which in itself substantially enhance well safety.

If base plate 300 is installed before blowout preventer 306 is mounted, base plate 300 can be installed as a whole plate with a center through-hole for well head 303 and well head brace 305.

FIG. 10 shows a containment and protection chamber 310 deployed over blowout preventer 306. For deploying after a blow out event to contain, capture, and harvest the blowout hydrocarbon flow, containment and protection chamber includes a flanged pipe adaptor 314 and a control valve 312. Containment and protection chamber 310 is placed over the blowout preventer 306 on base plate 300 and with a damaged riser pipe 317 already cut away from it.

A hydrocarbon collection pipe can be mounted on pipe adaptor 314 to pipe the captured hydrocarbon flow from containment and protection chamber 310 to a storage ship, a collection terminal, or a temporary storage unit at sea floor near the well. Since base plate 300 and containment and protection chamber 310 must be larger than blowout preventer 306 in order to adequately surround blowout preventer 306, and both are to be made of heavy and durable material, it is anticipated that anchoring piers 101 (shown in FIG. 1) and a chamber-top counter pressure platform 103 may not be needed and are optional in this embodiment. A via at the center of the top of chamber 310 is not needed for post-event emergency installation, and chamber 310 needs to be taller than the blowout preventer.

Figure 11:
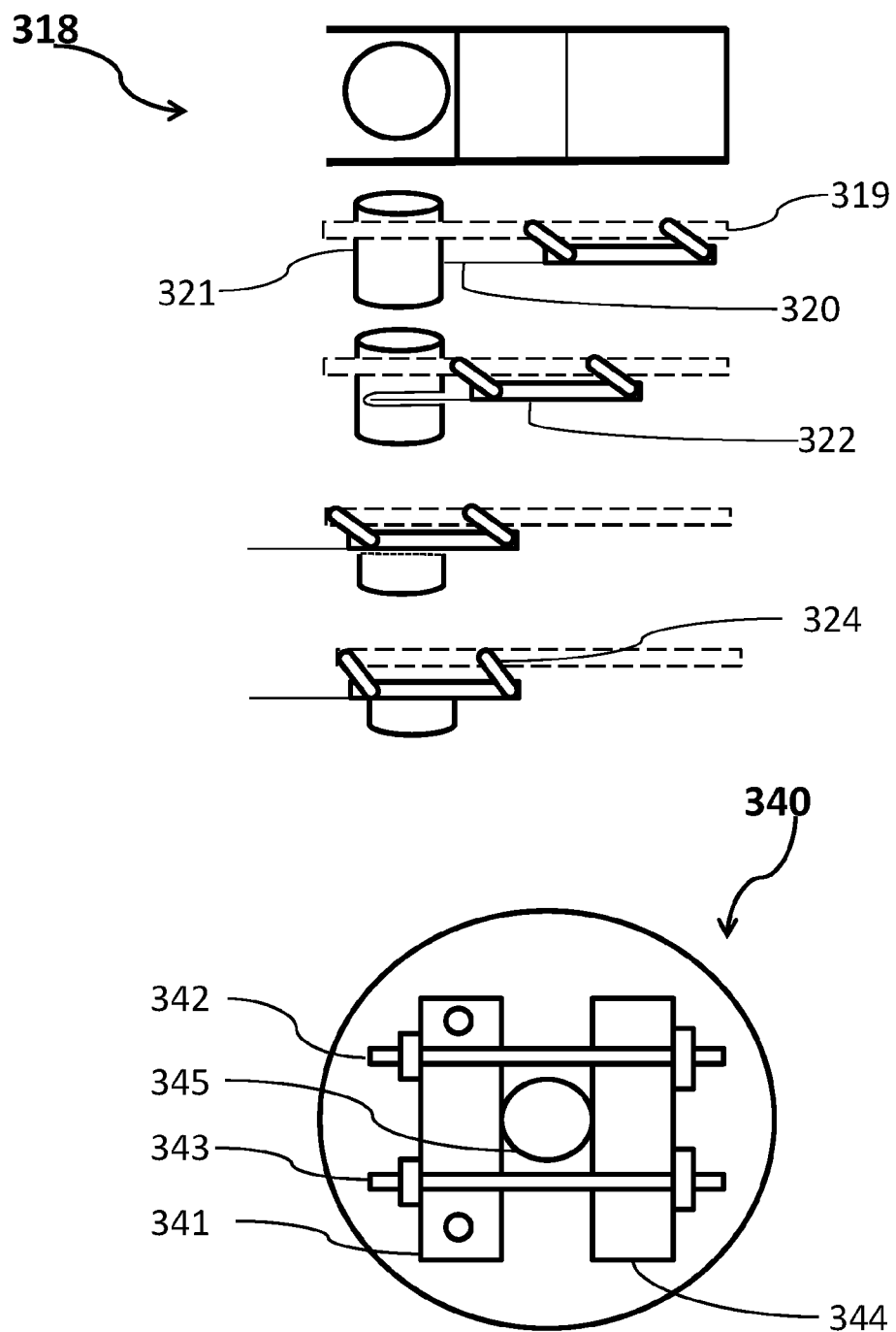
FIG. 11, FIG. 12 and FIG. 13 show several electrically and hydraulically operable pipe squeezers in accordance with an embodiment of the present disclosure.

For pre-event installation to enhance safety, containment and protection chamber 310 is additionally equipped with a via 315, through which the blowout preventer top pipe feeds through to the top of containment and protection chamber 310 with a blowout preventer top flange 316 sits on top of containment and protection chamber 310, and a riser pipe 317 is connected to flange 316 for conducting normal operation. An optional back up cut-and-seal slider assembly 318 as illustrated in FIG. 11 can be mounted on top of containment and protection chamber 310 to cut and seal a damaged riser pipe in case of an event and a blowout preventer failure. A pipe squeezing assembly can also be added on top of chamber 310 for redundancy. An optional door 335 permits ROV access to blowout preventer 306 and well head 303. Alternately a flexible pipe (flex pipe) can be inserted between the top flange of the blowout preventer (BOP) 306 to feed through via 315 with the top flange of the flex-pipe anchored and sit on top chamber 310, and connected to riser pipe 317. The advantage of this arrangement is that the containment and protection chamber of the same height can be used for both pre- and post-event installation. The flex-pipe extends the BOP pipe to adapt to the taller chamber 310, while further insulates BOP 306 from mechanical shocks coming from outside of chamber 310.

Additional safety benefit of a containment and protection chamber 310 is that it isolates blowout preventer 306 and well head 303 from undesired open access prone to accidental marine life collision or sabotage. Ideally, a sealed hydrocarbon collection pipe adaptor SHCPA 200 or a MPBPA 500 is added between containment and protection chamber 310 and riser pipe 317 to further enhance operational flexibility and safety.

FIG. 11 shows views of pipe slicer assembly 318 and block pipe squeezer assembly 340 to be mounted on and anchored to the top of containment and protection chamber 310 or a general purpose assembly mounting and anchoring platform such as platform 103 shown in FIG. 1. Pipe slicer assembly 318 is a cut and seal slider, where assembly tracks 319 mounted on both sides of a target object 321 guide blade 320 to cut target object 321. When blade 320 completes the cut and traverse along tracks 319 pass target object 321, seal cap 322 located behind blade 320 drops down to seal the cut pipe. The drop is facilitated by levers 324. Pipe squeezer assembly 340 includes an anchor block 341 and rails 342 and 343. A ramming block 344 presses toward anchor block 341 and squeezes a target object such as an oil pipe 345 flat and shut.

Figure 12:
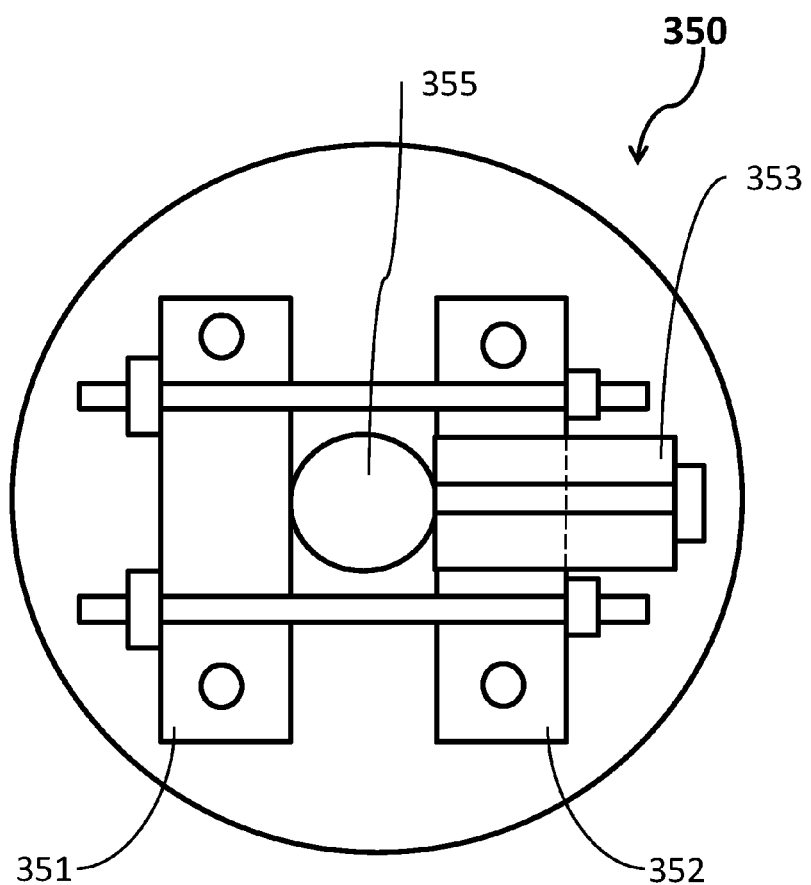

FIG. 12 shows a top sectional view of a block and piston squeezer, where both blocks 351 and 352 are mounted and anchored to the top of containment and protection chamber 310 or a general purpose assembly mounting and anchoring platform such as platform 103 shown in FIG. 1. A piston 353 is tightened to squeeze oil pipe 355 flat and shut.

Figure 13:
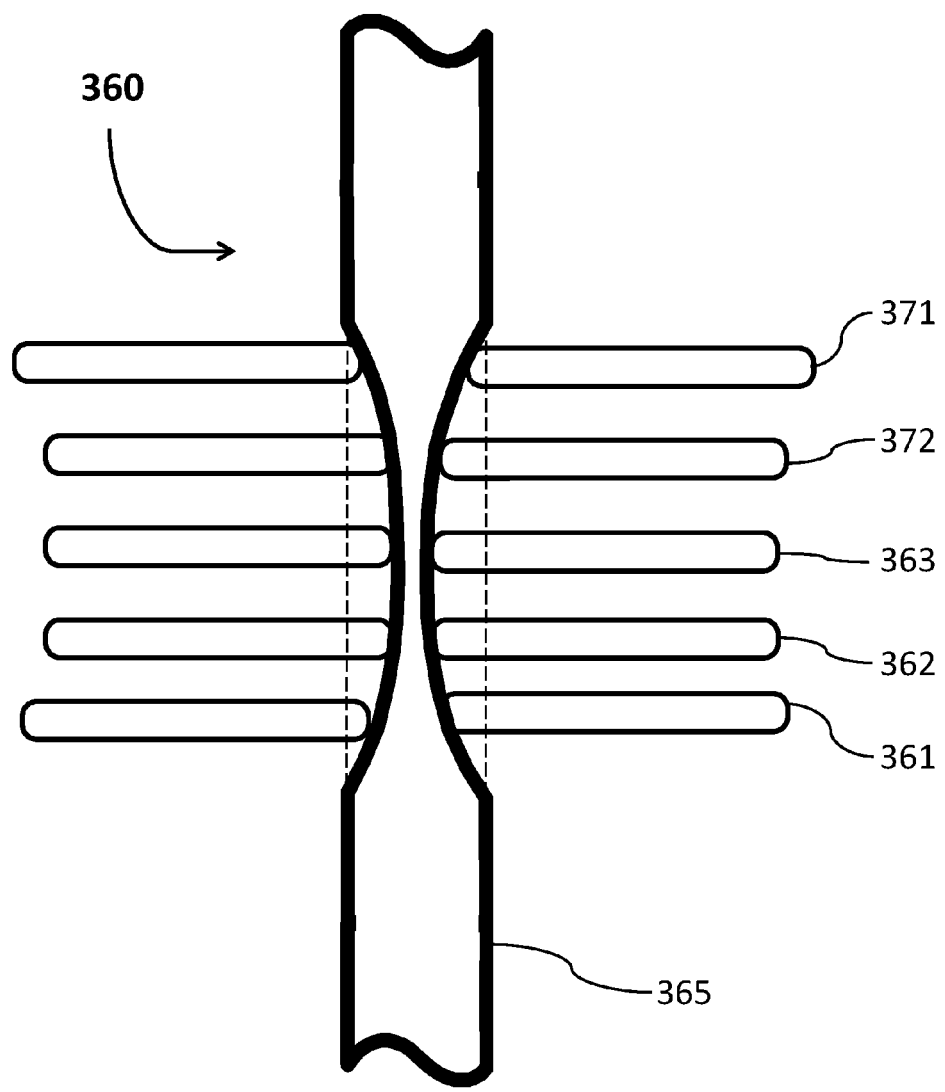

FIG. 13 is a conceptual drawing of a multi-stage pipe squeezer which reduces mechanical stress on a squeezed pipe 365. A squeeze stage comprised of squeezers 361 and 371 and a squeeze stage comprised of squeezers 362 and 372 squeeze pipe 365 partially and progressively shut, until a squeeze stage composed of squeezer 363 squeezes pipe 365 fully shut. Any number of stages can be constructed to optimize the shut-off speed and minimize potential for pipe breakage.

A pipe slicer or a pipe squeezer such as any of the ones shown in FIG. 11, FIG. 12 and FIG. 13 can be incorporated with containment and protection chamber 310 in multiple stage stacks, or stack mounted on a general purpose assembly mounting and anchoring platform 103 as described in FIG. 1, to replace or back up the functions of a blowout preventer.

Figure 14:
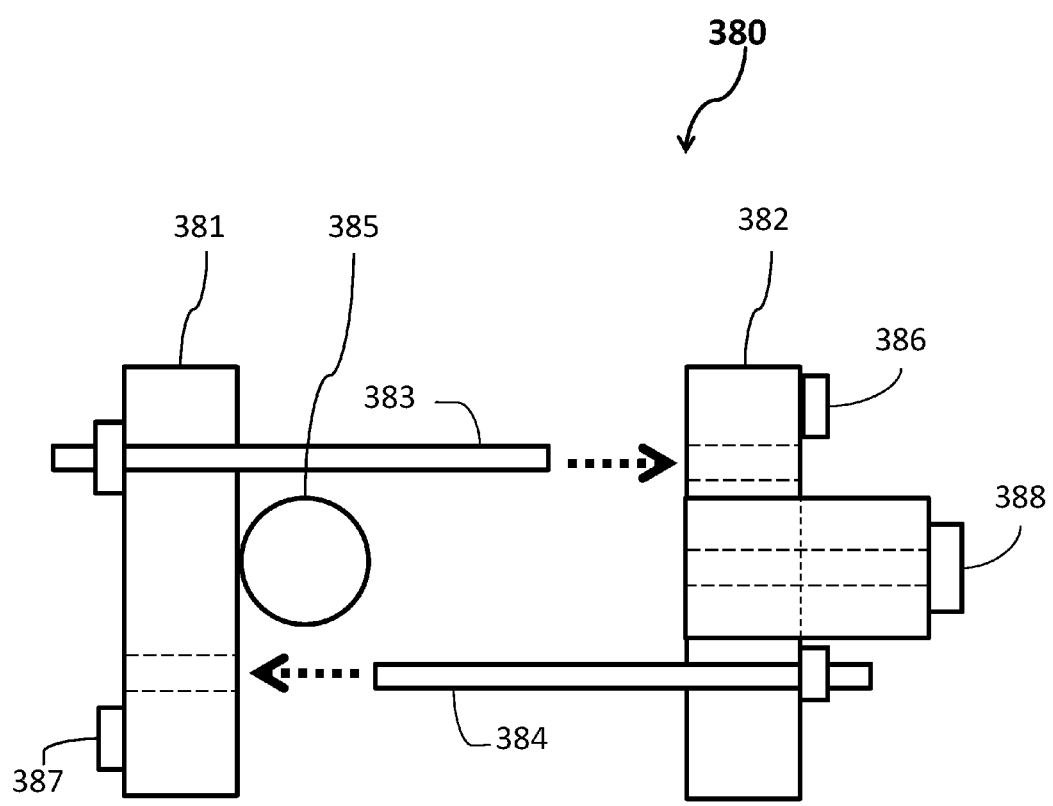
FIG. 14 shows a roaming pipe squeezer in accordance with an embodiment of the present disclosure.

FIG. 14 shows a mating pair of a roaming pipe squeezer that can be deployed with an ROV to squeeze shut any pipe section 385. Blocks 381 and 382 (with or without a piston) are deployed to the opposite sides of a pipe section and assembled together. Blocks 381 and 382 and a piston are hydraulically operated to come together to squeeze shut pipe section 385. Rods 383 and 384 are mounted on blocks 381 and 382, as shown in FIG. 14. Rod 383 is inserted through a hole in block 382. Rod 384 is inserted through a hole in block 381, as shown. Tightening disks 386 and 387 parked on blocks 381 and 382 are then mounted onto rods 383 and 384, and hydraulically operated to tighten blocks 381 and 382 against pipe 385. Optional piston 388 further assists the pipe squeezing.

Conventional hydrocarbon kick detection is conducted on board a drilling or production rig by analyzing measurement of indirect indicators such as drilling mud pit volume change, fluid out-flow of the well compared to fluid pumped into the well through the drilling pipe, or drill pipe fluid pressure measured at the pump which is difficult to interpret because so many different factors can affect that pressure. These indicators unfortunately can be masked by operational activities. Furthermore, the indicators are then displayed for human interpretation. These difficulties compounded by the time lag between a dangerous hydrocarbon kick occurrence at the well bore and the detection of indirect indicators make timely issuance of a command to activate a conventional BOP difficult to achieve. When and if a conventional BOP is activated, its annular seals can seal the tubal core chamber of the BOP, but can not seal a pipe present in the BOP core chamber. Its blind shearing ram can shear a pipe present in BOP, but can not shear pipe joints, and can not shear an off-centered pipe. The rubberized material used in the rams and the annular seals in the conventional BOP, as well as the movable rams that join with the tubal members to form the tubular core chamber of BOP are not designed for extended hydrocarbon exposure and prone to corrosion and leak. Embodiments described below provide solutions to these problems.

A direct hydrocarbon-kick detection and automated kick management system using a full featured SHCPA 200 shown in FIG. 3 can be retro-fitted between conventional blowout preventer 306 and riser pipe 204 as shown in 250 of FIG. 9. Similarly, such system can be incorporated into a new blowout preventer 399 as described in FIG. 15, 440; or, alternately installed between well head 303 and a conventional blowout preventer 306 using MPBPA 500, as illustrated in system 710 in FIG. 22. Furthermore, with a pressure sensor installed in a sensor assembly 208, the diversion branch in SHCPA and MPBPA can be used to relieve over pressured drilling fluid present in an annular space between the inner-most casing pipe (also called the production casing pipe) and the production pipe to manage and regulate the difficult annular pressure buildup problem during hydrocarbon production mode. The branch can be further fitted with a bladder to store the over-pressured over-flow fluid, and to push back the fluid when the annular pressure drops. One example of such a bladder is a balloon bladder. Similarly, the annular pressure between two casing pipes can be regulated through a branch pipe as well. This can be accomplished by equipping a branch with a pressure sensor, and connecting the branch to the annular space and a fluid overflow bladder. The assembly regulates pressure in the annular space by conducting over pressured drilling fluid out of the annular space into the overflow bladder. When the pressure reduces in the annular space, the fluid returns back to the annular space.

Figure 15:
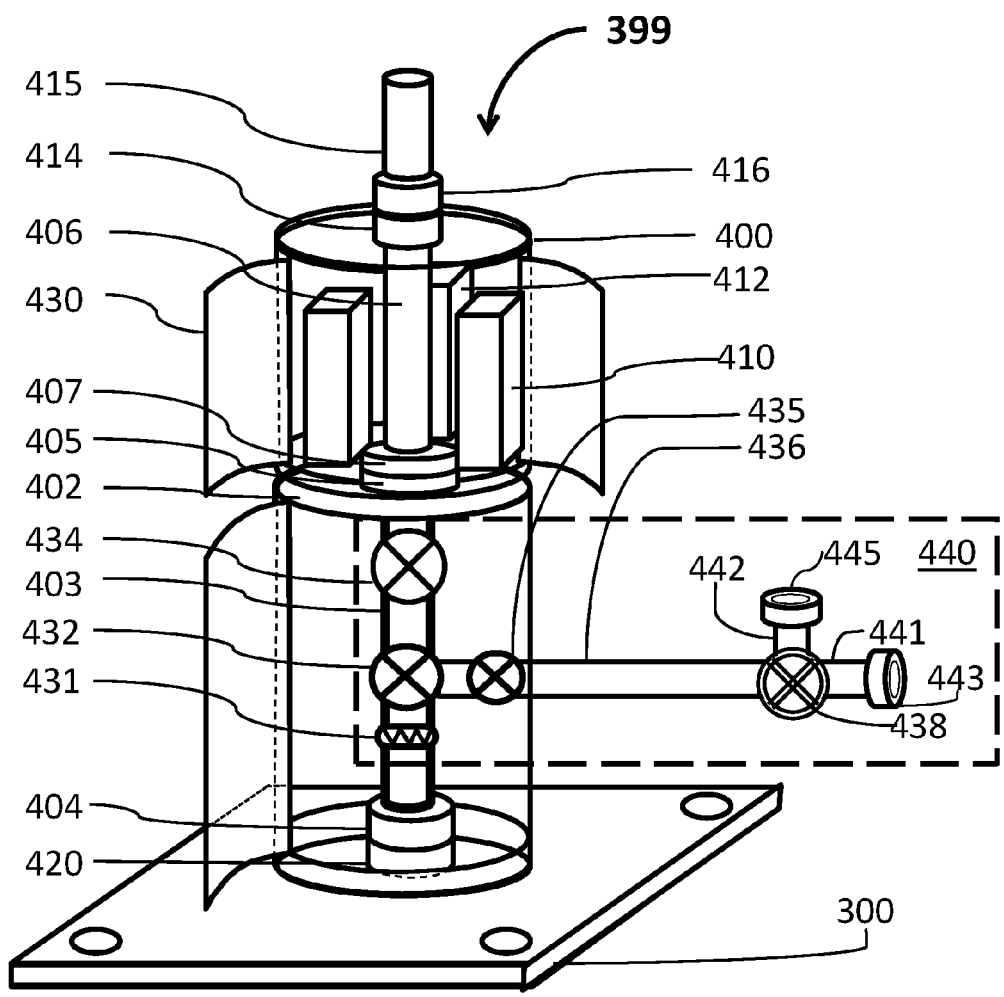
FIG. 15, FIG. 16, and FIG. 17 show various assemblies that can replace a conventional blowout preventer in accordance with an embodiment of the present disclosure.

FIG. 15 shows a blowout preventer 399 with a simpler, sturdier, and more effective design than conventional blowout preventer 306. Blowout preventer 399 includes a two level protection and support chamber 400 mounted on well head protection base plate 300. A lower pipe section 403 is made of stronger and thicker walls of hydrocarbon compatible material than an ordinary well pipe. A flange 404 at the bottom of blowout preventer 399 mounts to well head 303 at the flange 420. Pipe section 403 extends through an upper level floor 402 of chamber 400 terminating at a flange 405 resting on upper level floor 402 of chamber 400. An upper well pipe section 406 is made of material that can be reliably squeezed shut or cleanly cut and sealed. A flange 407 mounts to flange 405 at the top of lower pipe section 403.

A multi-stage pipe squeezing stack 410 is composed of devices similar to, for example, any of those shown in FIGS. 11, 12 and 13. An off-setting multi-stage cutting and sealing stack 412 is mounted 90 degrees from multi-stage pipe squeezing stack 410. Both stacks are mounted on upper level supporting floor 402 of protective chamber 400 for support and anchoring. Upper level pipe 406 extends through the ceiling of protective chamber 400 with a connecting flange 414 sitting at the top of the protective chamber 400, to be connected to a riser pipe 415 through a flange 416. Alternately, a SHCPA 200 or a MPBPA 500 can be installed between BOP flange 414 and riser pipe flange 416. Doors 430 can be installed on select sides of protective chamber 400 at both levels for access, maintenance and inspection.

Figure 16:
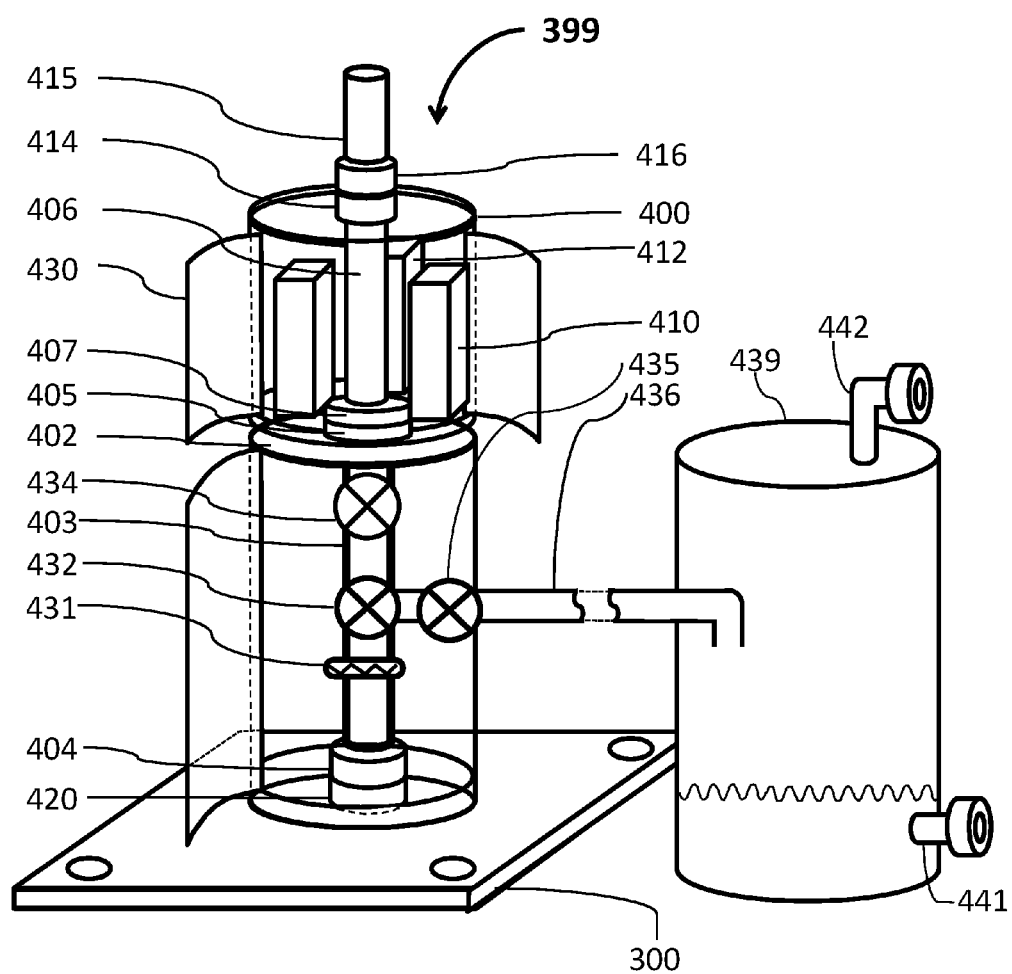

Hydrocarbon kick detection and management system 440 can be incorporated with lower pipe section 403 as an additional safety feature not available in conventional blowout preventer 306. Hydrocarbon kick detection and management system 440 includes a control valve 434, a sensor assembly 431, a hydrocarbon diversion pipe 436 for conducting hydrocarbon kick flow to a safe distance for collection or storage, and a control valve 435 for pipe 436. Control valve 434 can be set to a normally open position to allow drilling mud and drill pipe to pass through, and closes when detecting hydrocarbon presence to divert hydrocarbon to diversion pipe 436. Control valve 435 is normally closed to prevent drilling mud from entering diversion pipe 436, and opens when sensor 431 detects presence of hydrocarbon to divert the flow to a storage unit 439 in FIG. 16. A separate pipe outside of the blowout preventer can be used for accommodating drilling mud up-flow. Control valve 434 can then be a one-way valve set at a normally closed position, preventing any up-flow and allowing only down flow of drilling mud. Progressively more advanced kick management capability can be attained by progressively adding the following components: an optional bleed valve 432 to control the rate of hydrocarbon release to diversion pipe 436; an optional oil and methane separator 438 equipped with oil pipe 441 which can be extended with a flange connector 443 to lead to an oil storage unit at seafloor or a collection facility at sea surface. A methane pipe 442 which can be extended with a flange connector 445 to lead to a methane storage unit or a collection facility. Oil and gas separator 438 can be constructed using a sufficiently strong filter that allows gaseous methane to pass to methane outlet pipe 442, and filters out oil to pass to oil outlet pipe 441. Alternately, separator 438 can be accomplished by using a storage tank 439 and gravity separation, by locating a gas outlet pipe 442 at a top location of the storage tank and an oil outlet pipe 441 at a bottom location of the storage tank, as illustrated in FIG. 16. Separating methane storage from oil at sea floor level allows each to be separately piped to separate storage units. A hydrocarbon manifold 450 shown in FIG. 17 can be used to fill multiple storage tanks 452 of a size suitable for handling and transport, each having a valve which closes when the tank is filled. Manifold 450 contains a battery pack, sensors, a control circuit, pipes and valves. The manifold 450 controls and conducts orderly filling of tanks 452 and orderly open and closing of valves. A docking unit 455 facilitates removal and replacement of tanks 452. Valve 453 closes when tank 452 is filled to a desired level. Valve 454 expels pre-existing pressure balancing liquid (e.g. sea water) in tank 452 as it is filled with hydrocarbon. The filled tanks can be removed and lifted to sea surface at a suitable time to transport to long term storage or processing facility. Methane gas can be filled at seafloor level to a desired compression level, and further compressed or liquefied at a processing plant. Filled tanks are removed and replaced aided by an ROV. Oil outlet pipe 441 can be piped to an oil tanker at sea surface at a safe location, or piped to a temporary oil storage unit at the sea floor, or to manifold 450 to fill multiple storage tanks to be transported to the sea surface at a suitable time. The hydrocarbons from pipe 436 can also be piped to a storage unit at seafloor, or a collection facility at sea surface.

To accommodate presence of production or drill pipe inside Valves 434 and 432, these valves are constructed in a self centering "iris shutter" style to close inward toward the center such that 434 seals around the pipe inside, and closes completely if no pipe is present. Optional bleed valve 432 is set to partially close to allow controlled pass through of the high pressure hydrocarbon flow to diversion pipe 436. Details of an iris shutter valve are described later in FIG. 26. The casing pipes, the production pipe and the drill pipe can all be fitted with their own safety valves at a low portion of the pipes to defend against threatening hydrocarbon kicks from surging further up the pipes.

Figure 18:
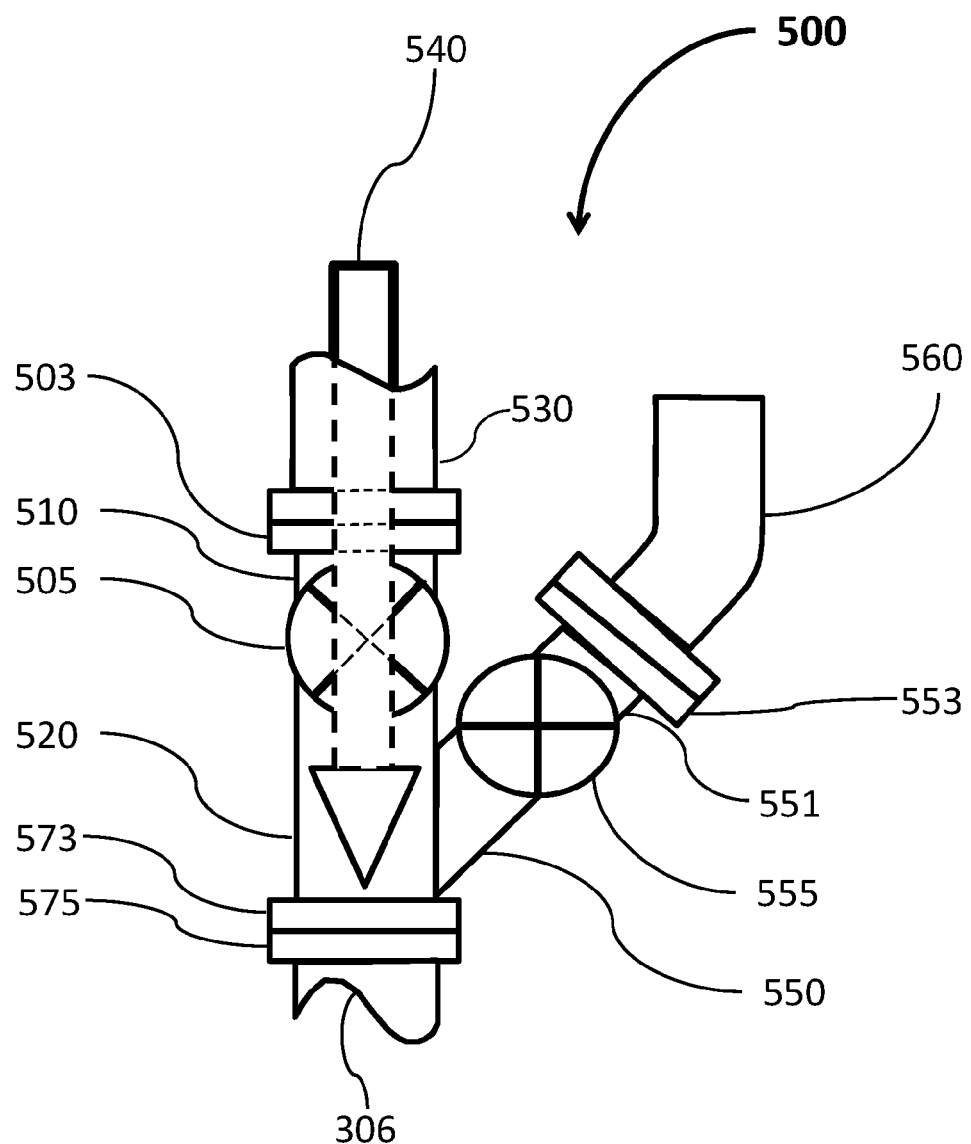
FIG. 18, FIG. 19 and FIG. 20 show multi-port branched pipe adaptors (MPBPA) in accordance with an embodiment of the present disclosure.

FIG. 18 shows a multi-port branched pipe adaptor (MPBPA) 500 having main branch 520 with a port 510 for well access or hydrocarbon capture, and at least one other branch 550 with port 551 for hydrocarbon capture or diversion of over pressured well fluids. The top of port 510 is equipped with a seal flange 503, which can seal mount to a riser pipe 530, secure a drill pipe or an assembly driver string 540, or a riser pipe containing a drill pipe or driver string, or a hydrocarbon collection pipe. During normal operation, port 510 can serve as a hydrocarbon collection port. Optional valve 505 allows port 510 to open for various operations including for assembly driver string 540 to pass through, or to close to divert a blowout flow for improved visibility when desired or needed before and during mounting of an apparatus or a pipe during a blowout flow. A hydrocarbon capture port 550 is equipped with a flange 553 to secure, and seal mount to a hydrocarbon collection pipe assembly 560, to further connect to a hydrocarbon collection facility such as a storage unit at the sea floor, or an oil tanker at the sea level to collect and store the captured hydrocarbons. A flexible pipe section with top and bottom flange connectors can be added to MPBPA 500 as desired. The storage unit at seafloor may be further equipped with a manifold as shown in manifold 450 in FIG. 17 to fill multiple storage tanks of a size suitable for handling and transport to a collection facility at sea level. A tank docking station facilitates removal and replacement of tanks.

Figure 19:
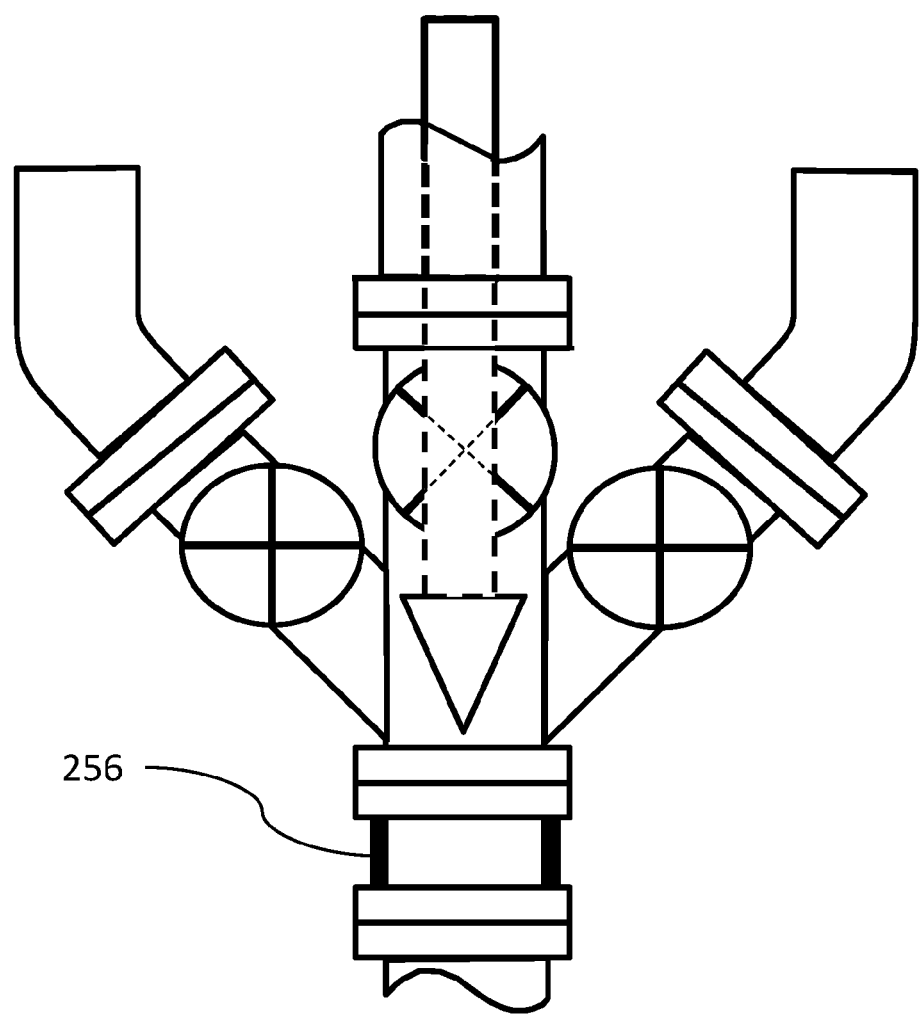
Figure 20:
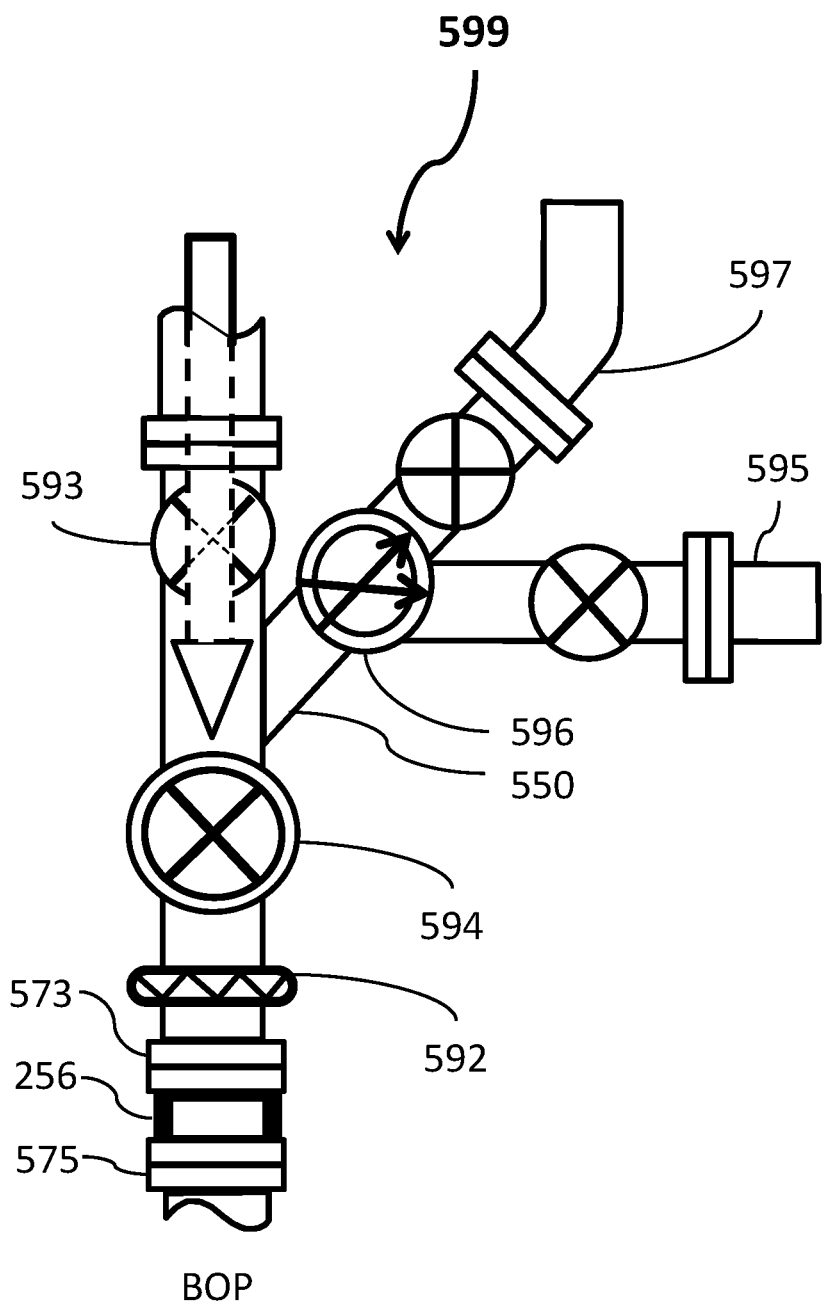

An optional valve 555 allows shutting the hydrocarbon flow when needed. Sonar, ultrasonic or electromagnetic wave generation/inspection devices can be mounted and run with assembly driver string 540. A BOP mounting port at the bottom of the main branch 520 of MPBPA 500 is equipped with a suitable flange 573 to form a sealed direct connection with a blowout preventer top flange 575. A pipe sleeve 256 as shown in FIG. 8, FIG. 19, and FIG. 20 having a flange 255 can be used for making a sealed connection between MPBPA 500 and a damaged pipe 246 that can not be easily removed from blowout preventer 306. Padded sealer pipe sleeve 256 includes elastomeric material reinforced with para-aramid synthetic fiber or some other pliable material with suitable chemical and physical characteristics covers damaged pipe 246 and fastened with fastener 254 to provide a seal. The diameters of the ports of MPBPA 500 are close to the diameter of the pipe that is spewing the hydrocarbon flow, so that deflection and reflection of the hydrocarbon flow is minimized. MPBPA 500 can be modified to have two symmetrical hydrocarbon collection ports to weight balance the assembly, and to increase the rate and flexibility in hydrocarbon collection. This is illustrated in FIG. 19. Many more side branches can be added.

Methane gas volume expands rapidly to become more explosive and dangerous as it rises from the sea floor level toward the rig. It is desirable to separate methane gas from oil, and pipe it away from the well at a level closer to the sea floor to a storage tank, or to gradually raise the pipe in a controlled manner to a methane gas collection facility. FIG. 20 shows a MPBPA 599 equipped with a pressure sensor and/or hydrocarbon detector, sensor assembly 592 installed at the lower end of the main trunk of MPBPA 599. When a high pressure hydrocarbon surge is detected, valve 593 automatically closes to divert hydrocarbons to branch pipe 550 which can be further piped to a storage tank at sea floor level. The storage tank can additionally serve as oil and gas separator as described in FIG. 16. Separator 596 allows methane to pass to gas pipe 597, and oil filtered out to oil pipe 595, each is extended separately to a separate storage at seafloor or a collection facility at sea surface. Hydrocarbon or pressure sensor 592 can be additionally fitted with a bleed valve 594, when sensor 592 detects hydrocarbon, it closes valve 593, and partially shuts the optional bleed valve 594. Bleed valve 594 allows controlled hydrocarbon release into branch pipe 550. Alternately, hydrocarbon kick detection and management system can be installed in a blowout preventer as described in FIG. 15.

A multi-port branched pipe adaptor should be incorporated in all well systems at above a blowout preventer, below a blowout preventer, or ideally both above and below a blowout preventer, or located inside a new blow out preventer as standard safety features.

Figure 21:
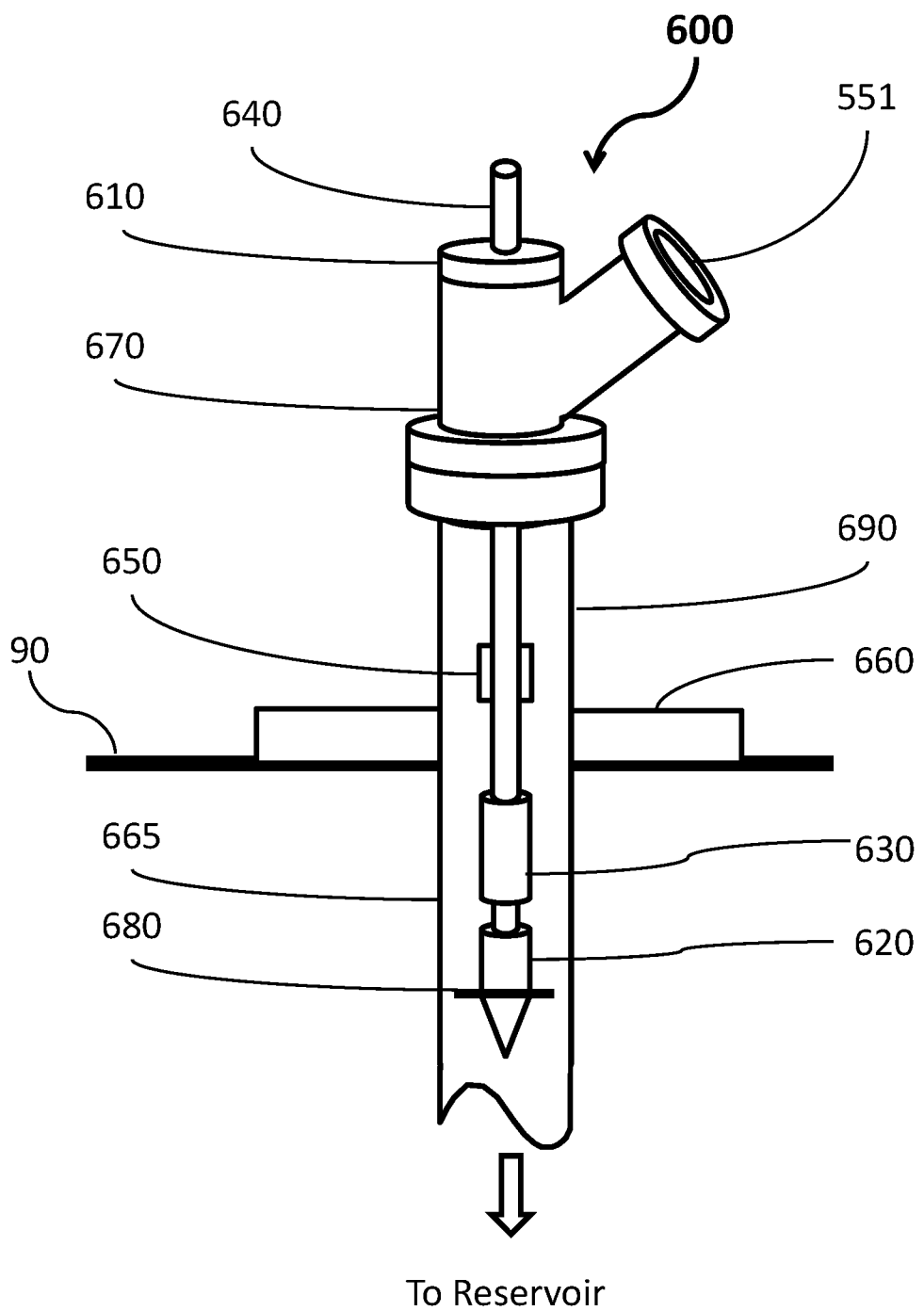
FIG. 21 shows a device driver deploying well monitoring and inspection devices, pipe repairing assembly, and well plugging devices in accordance with an embodiment of the present disclosure.

FIG. 21 shows a device driving string 640 mounted through MPBPA 600. Device driving string 640 is used for running and setting devices for well inspection, repair, and plugging from above or below blowout preventer 306. If a drill pipe or a device driver is broken off and remains in blowout preventer 306 and the well below, it should be removed through port 670 before a new driving string is mounted. If the pipes are stuck in an unsuccessfully activated blowout preventer 306, the pipes and blowout preventer 306 need to be removed. An MPBPA pre-installed below blowout preventer 306 enables the safe removal of a damaged or malfunctioning blowout preventer as further described below.

After the damaged blowout preventer is removed, a new BOP can be installed while the MPBPA below the BOP continues to collect the hydrocarbon flow through side branch 550. A device driver string 540 can be mounted through the MPBPA above BOP 306. If a damaged BOP is removed, the MPBPA pre-installed between the well head and the BOP, can be used to mount device driving string 540 from its main port 510 through the well head while hydrocarbon flow is conducted through branch pipe 551.

A device running example is illustrated in FIG. 21. Well plugging assembly 620 is mounted at the bottom of assembly driver string 640. A retractable rotary cutting device 680 is mounted with the plug to mill through possible debris. A monitoring and inspection device 630 is mounted above a plugging device 620. If pipe repair is required, expandable casing/pipe repair assembly 650 is mounted next up above monitoring and inspection device 630. Assembly driver string 640 is launched through the MPBPA 600, and driven into a BOP tubular core chamber 690 through the assembly driver string port 610, BOP port 670, into the well. Devices are grapple mounted, and released and set at locations. A tubing hanger 660 is located at sea floor 90. Sonic, ultrasonic, or electromagnetic emitters, transducers, or sensors can be deployed to select strategic locations to study the condition of the well casing, pipes, valves, seals and other well components. Device driving string 640 is mounted with repair components or assemblies to location, released, set, and inspected. The assembly device driving string 640 is then driven through the adaptor 200 down to an appropriate well plugging location, one example being at the bottom of the well at reservoir level as in a "bottom kill," and the plugging assembly released and set. As stated above, alternatively, a drill pipe loaded with cement and mounted through MPBPA 600 below blowout preventer 306 can be lowered down to the bottom of the well and used to pump cement to the bottom of the well to "bottom kill" the well. When there is a damaged pipe stuck inside the BOP core chamber 690, assembly device driver string 640 can be used to cut away obstruction, and remove the damaged pipe out of BOP core chamber 690 and well bore casing pipe 665.

In case where a bore hole to casing or production tubing annulus seal is broken, a retractable tube cutting device can be used to cut the production tube at the reservoir ceiling level in order to reach and re-seal the wellbore, reservoir, and production tube interface. Alternately, the Production-Can holes can be opened, and an assembly drill pipe string passing through the adaptor is used to pump cement through the Production-Can holes to close the well and seal the well bore to well pipe annulus.

FIG. 22 shows installation of MPBPA 500 above blowout preventer 306. Outside of a blowout event, there should be no hydrocarbon flow or presence in the casing tube, in the BOP core chamber, nor in the MPBPA chamber outside of a production pipe. The presence of MPBPA 500 enables complete blowout hydrocarbon collection from above blowout preventer 306, inspection and repair of blowout preventer 306, as well as access to the wellbore through blowout preventer 306. An optional anchoring infrastructure and support and protection platform 103 installed above blowout preventer 306 anchors and protects blowout preventer 306, blowout preventer 306 to MPBPA 500 connection 505, and operations launched through the upper MPBPA 500. Platform 103 can also be mounted on top of MPBPA 500 with a top flange 503 that sits atop platform 103 to also protect MPBPA 500.

Blowout preventer as one used at Macondo Well is more than 5 times wider and 10 times taller than well head 303, and weights more than 300 tons. In conventional hydrocarbon well installations, there is no structural support for the blowout preventer and its connections to the riser pipe and the well head. An explosion, an earthquake, a whale, or a fallen riser pipe can upset the vertical stack, causing the blowout preventer to lean and leak with no access to the well to close off the hydrocarbon flow and remove the endangered blowout preventer. Potentially the blowout preventer can fall after leaning for a prolonged period, breaking its connection to the well pipe and well head, or even taking out part of well head 303 and the well casing with it. The set up shown in FIG. 22 remedies these serious shortcomings.

FIG. 22 shows MPBPA 500 having optional hydrocarbon and pressure detection and diversion system 710 installed between blowout preventer 306 and well head 303. An optional structural support framework 760 is mounted across the bottom of blowout preventer 306 and anchored to anchoring piers 101 to further support and stabilize blowout preventer 306 from below blowout preventer 306. A base plate 300 and well head brace 305 supports and protects well head 303 and its connection to system 710. Details of base plate 300 and well head brace 305 are shown in FIG. 9. Base plate 300, with its large horizontal surface resting on the seafloor is self anchoring. It can also be used to anchor BOP, as well as help anchoring piers 101.

Particularly large and highly compressed methane gas bubbles mixed in with oil rising from a methane rich reservoir into a well bore will quickly expand in volume and accelerate the rise to the rig causing explosion and destroy equipment. It is also a precious resource that is burned off and wasted in conventional oil well operations. The problems of conventional kick detection method and the reliability of the conventional BOP are discussed previously. In addition, even if a BOP successfully rams and shears pipes within it and shuts off a high pressure blowout flow, the well and the earth formation beneath could be at risk. It is also extremely difficult and costly and maybe impossible to unwind an activated BOP to recover the well. The embodiments below provide solutions to these problems.

Figure 23:
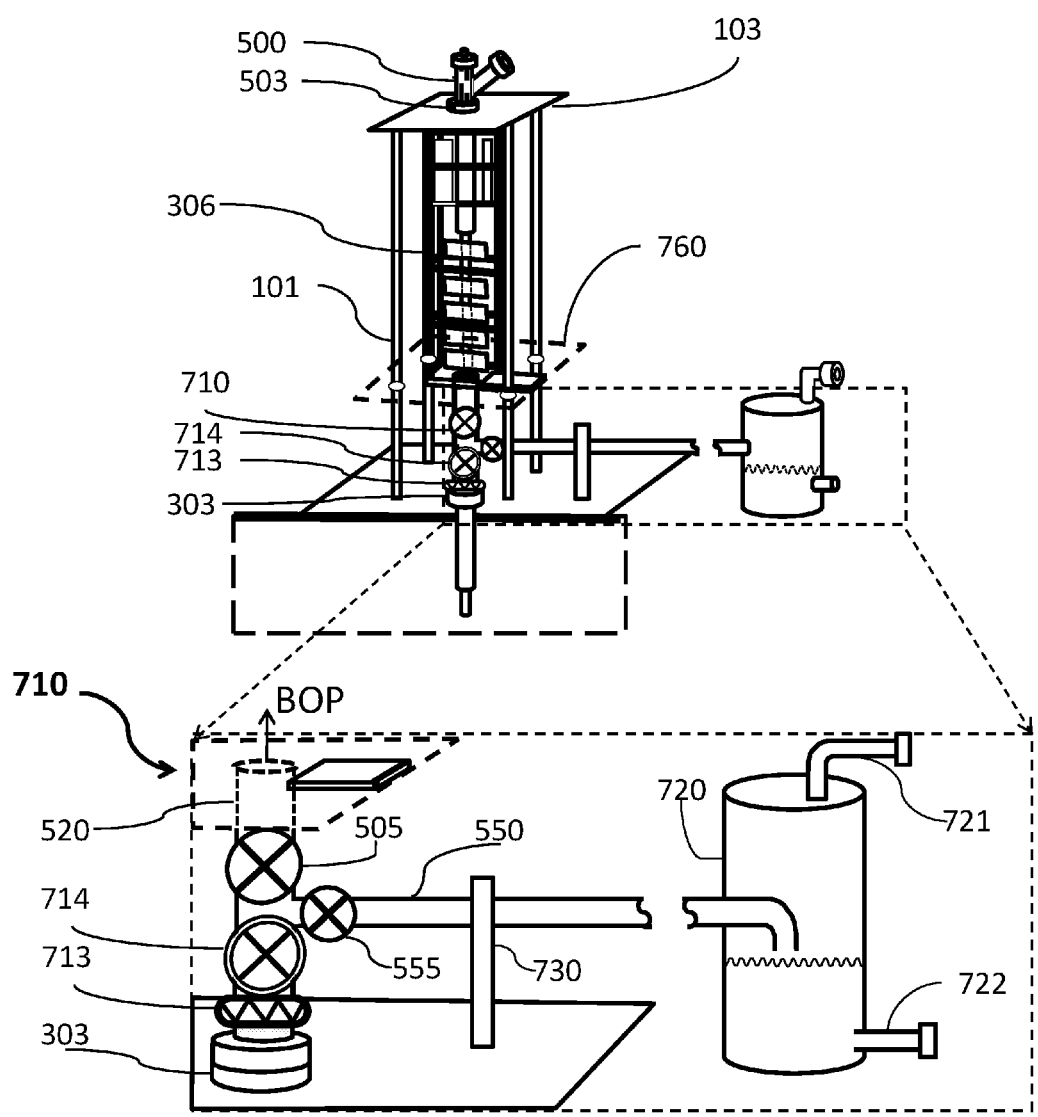

Installing Multi-Port Branched Pipe Adaptor (MPBPA) 500 between well head 303 and blowout preventer 306 provides access to the well and control to the hydrocarbon flow from below blowout preventer 306. This capability is vital when blowout preventer 306 is malfunctioning, jammed, leaking or leaning. Closing valve 505 in MPBAP 500 enables safe removal of a damaged or leaning blowout preventer. A MPBPA assembly installed below blowout preventer 306 further enables inclusion of a hydrocarbon detection and management system 710 similar to system 440 described in FIG. 15. System 710 is fitted with a pressure and/or hydrocarbon chemical sensor assembly 713 to directly detect and divert threatening hydrocarbon kick to a distance away from the well for safe release and storage, or to a separator 596 to separate oil and gas for separate diversion and storage. Iris shutter valve 505 closes when sensor 713 detects an unexpected high up-flow pressure or hydrocarbon presence. Diversion pipe 550 conducts the hydrocarbon kick flow to a storage unit 720 at a practical and safe distance as shown in FIG. 23. Storage unit 720 may be located on seafloor to accommodate temporary storage during storage ship absence. Optional pipe support 730 is not needed if flexible piping is used. Branch pipe control valve 555 can be used to control the hydrocarbon release rate into diversion pipe 550. Alternately, hydrocarbon (and/or pressure) sensor assembly 713 can be combined with a bleed valve 714 to control hydrocarbon release into diversion pipe 550. Separator 596 separates gas collection from oil collection. Separator 596 can be constructed with a sufficiently strong filter that allows gaseous methane to pass, and filters out oil. Alternately, separator 596 can be incorporated into storage unit 720. Gravity separates the lighter gaseous methane to the upper part of storage unit toward its top, and oil sinks to the lower part of storage unit 720. Pipe 721 conducts methane away to a methane collection facility and pipe 722 conducts oil to an oil collection facility. Valves 505 and 714 are centrally closing annular valves. They can be constructed using iris shutter valves described later in FIG. 26 to accommodate pipe presence inside valves 505 and 714. The details of construct and operation of system 710 are similar to that described in system 440. During production mode hydrocarbons flow upward through a production pipe mounted through the center of MPBPA main branch 520 and the tubular core of BOP 306. There should be no legitimate hydrocarbon presence in the annular space outside of the production pipe. System 710 is as essential before and during production.

Figure 24:
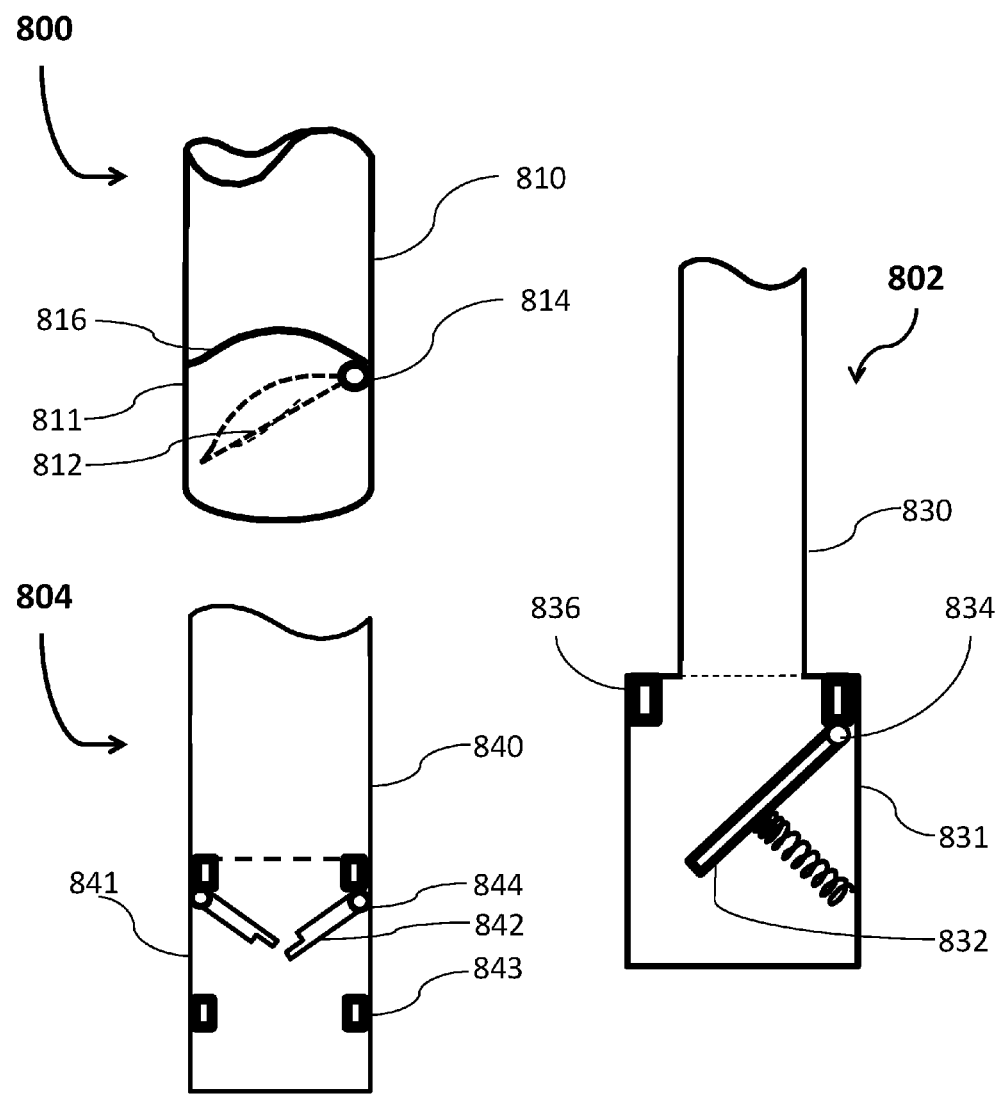
FIG. 24, FIG. 25 and FIG. 26 show pipe assemblies using a one-way check valve to prevent up-flow as well as various configurations of such one-way check valves in accordance with embodiments of the present disclosure.

In FIG. 24 is shown a first line defense at the bottom of the wellbore against a high pressure hydrocarbon kick from surging upward into a well system. An inner-most casing pipe 810 of the well system is fitted with a check valve 811 preventing up-flow as shown in an assembly 800. Casing pipes that reach the proximity of a hydrocarbon reservoir can each be fitted with a centrally closing check valve to prevent rogue hydrocarbons from entering it or annular space between the pipes. Similarly, in another assembly 802, a check valve 831 is fitted to the bottom of a drill pipe 830 to prevent hydrocarbons from entering upward into drill pipe 830. An assembly 804 shows a pipe 840 fitted with a sensor controlled gate valve 841. These check valves close when encountering an upward pressure preventing upward fluid flow, open proportionally when encountering downward pressure to allow downward insertion of fluid or objects. Check-valves 811 and 831 are constructed in a shutter plate manner. In response to an up flow pressure, a shutter closing plate 812 for valve 811 and a shutter closing plate 832 for valve 831 hung from hinges 814 and 834 respectively rise to close tight against a closing seat 816 for valve 811 and a closing seat 836 for valve 831, preventing a high pressure hydrocarbon kick from surging upward into pipes 810 and 830 above valve 811 and valve 831. Closing plates 812 and 832, or hinges 814 and 834 can be spring loaded such that closing plates 812 and 832 are normally at closed positions. Assembly 804 shows a threshold pressure sensor or a hydrocarbon chemical sensor 843 in combination with a sensor controlled gate valve 841 mounted to a pipe 840 that also prevents hydrocarbon up-flow into pipe 840. When sensor 843 detects a threshold pressure or hydrocarbons, sensor 843 produces an output that drives gates 842 hung on hinges 844 to shut close, and shut out the rogue hydrocarbon kick flow. Gates 842 and hinges 844 can also be set at a normally closed position by spring loading. All three types of check valve illustrated in FIG. 24 can be used for all pipes or tubal members of an apparatus.

While all three valves in FIG. 24 can be used on any pipe, it is preferable that the inner-most casing pipe of a well be fitted with a tubal shutter check valve having the same outer diameter as shown in 811. The passage way of check valve 811 should be close to the inner diameter of casing pipe 810 and larger than the outer diameter of a production pipe (not shown), which is inserted inside casing pipe during well completion process for production. The geometry of the closing plate 812 and its seat 816 are shaped to fit this requirement. The smaller drilling pipe 830 (at 5.5" OD and 3.5" ID) places less restriction to the shape and size on check valve 831. A simple shutter check valve 831 as show in assembly 802 has a square cross section (or any other usable geometric shape, for example a hexagon), a flat closing plate 832 and closing seat 836 slightly larger than, and covering the inner diameter of drill pipe 830. Valve 831 needs to fit well within the inner most casing pipe 810, or fit within the production pipe if it is to be used inside the production pipe.

Figure 25:
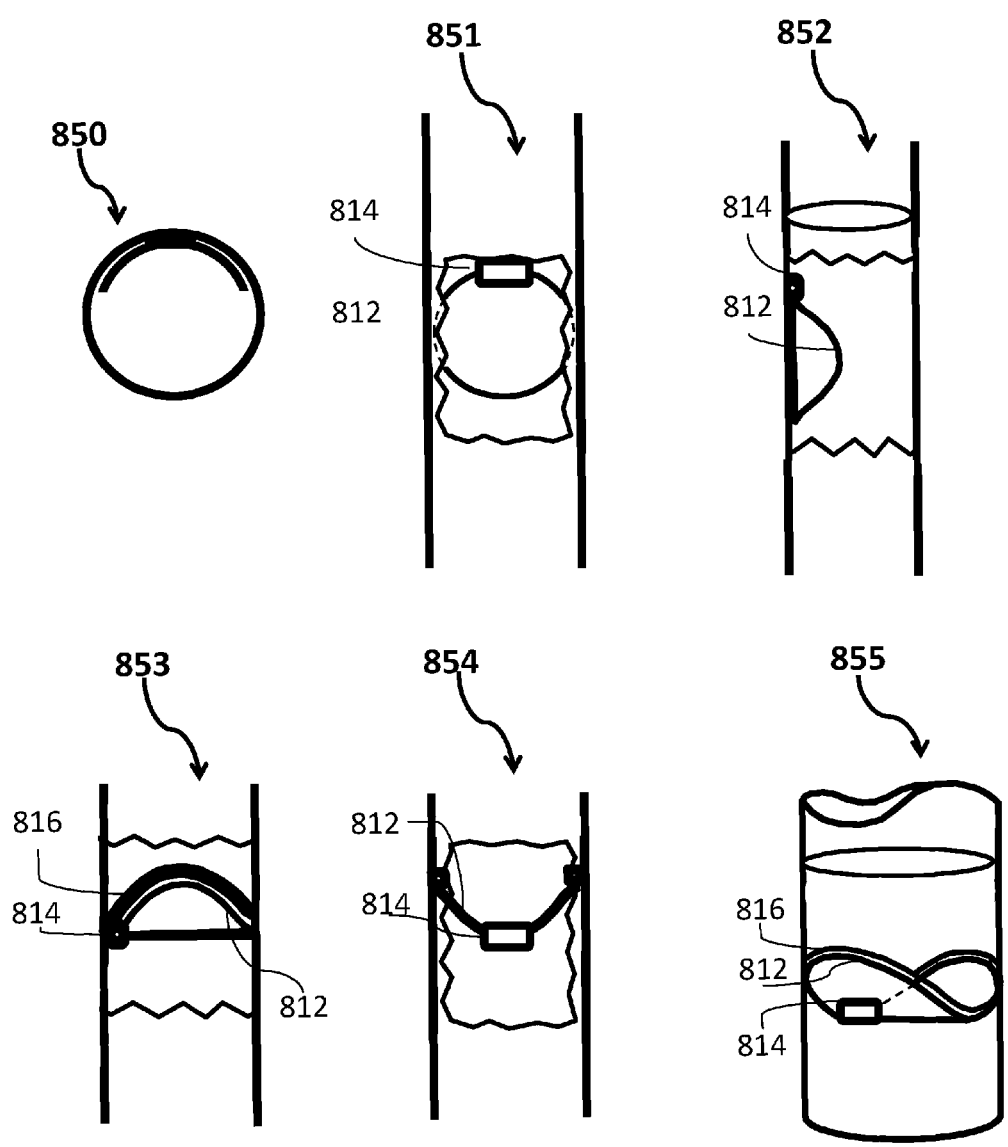

FIG. 25 illustrates various inner views of the workings of tubal shutter check valve 811 in assembly 800 shown in FIG. 24. A properly shaped closing plate 812 hangs from hinge 814 mounted on a tubal wall location can be spring loaded at the hinge or from the tubal wall below the hinge to maintain a normally closed safety position against shaped ridge seat 816 along the inner tubal wall of valve 811. When encountering a large enough net downward pressure, the closing plate 812 opens downward. Upward pressure of a hydrocarbon kick pushes the closing plate even tighter against closing seat 816, securely shut off upward passage to the casing pipe 810 above. Downward pressure from the insertion of a production pipe, a packer, a drill pipe, or other apparatus pushes down closing plate 812 to open valve 811. At the fully open position, shaped closing plate 812 hangs down and conforms to the tubal wall as shown in top view 850 and side view 851. Side view 852 shows the fully open position of closing plate 812 at a 90 degree angle from side view 851. Views 853 and 854 are side views 90 degrees from each other of closing plate 812 at closed position. View 855 shows the closing ridge seat 816 along the inner tubal wall and closing plate 812 closing against ridge seat 816, viewed at a 45 degree angle from views 853 and 854.

Figure 26:
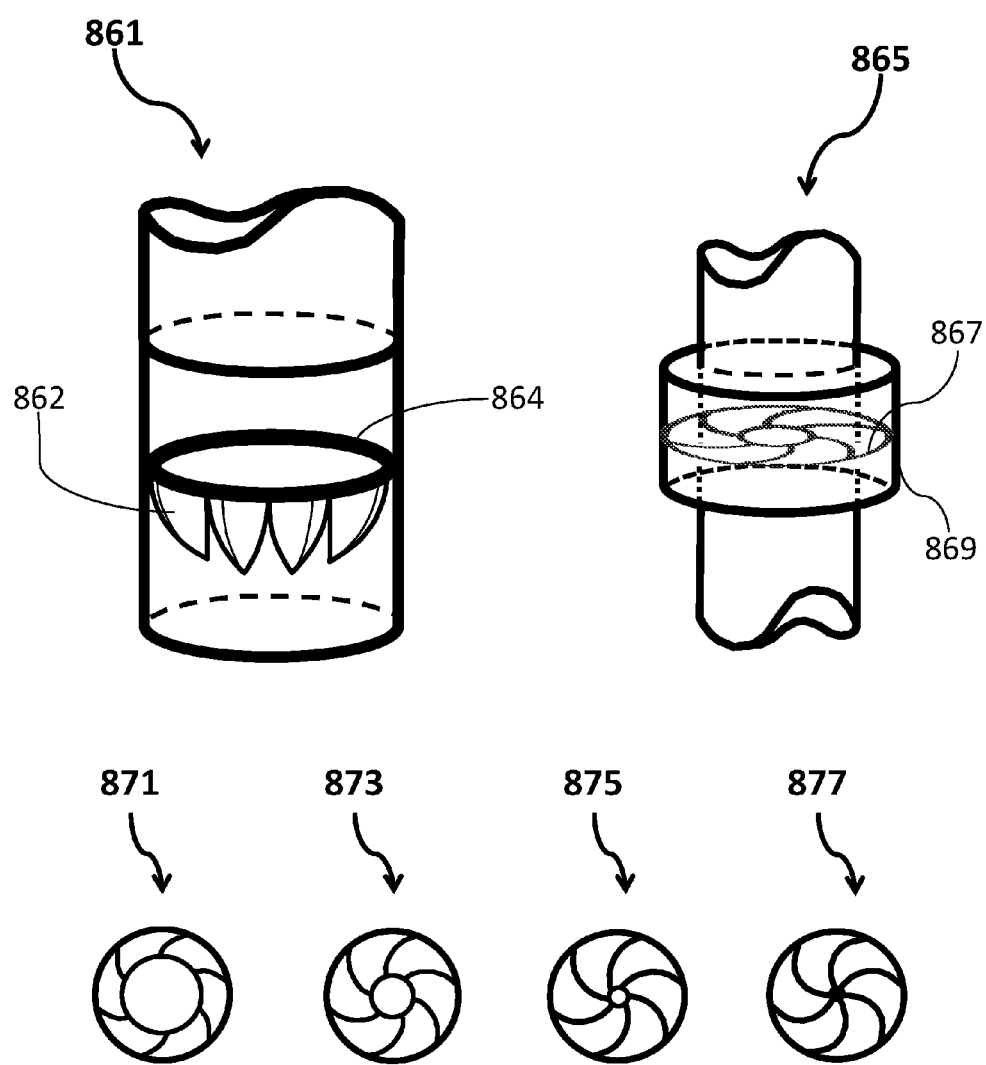

FIG. 26 shows a center closing iris shutter check valve 861. Properly shaped closing blades 862 hang downward at a suitable angle from spring loaded hinges 864 mounted in a circular ring around an inner parameter of iris shutter check valve 861. When encountering an upward hydrocarbon surge, the blades rise to close tight toward the center of valve 861, closing off its flow path upward. When there is no pipe present inside valve 861, the shutter blades close completely. Shutter blades 862 and hinges 864 can be spring loaded to a normally closed position. Valve 861 can also be configured and controlled to be normally open to allow pipes and legitimate fluids such as drilling mud and seawater to pass through, and only closes to prevent unwanted flow, for example hydrocarbons.

Another way of constructing a centrally closing iris shutter valve is Horizontal blade iris shutter valve 865. Horizontally mounted closing blades 867 move toward the center to close, and retract into a blade chamber 869 surrounding the central passage to open. The horizontal iris shutter can be configured to be a two-way valve, or a one-way valve of either direction. The blades of a horizontal shutter valve can be set at a normally closed position or normally open as needed in different applications. Views 871, 873, 875 and 877 show top cross sectional views of a centrally closing valve at various degrees of closing (opening) positions. If a pipe is present inside shutter valve 861 or 865, the shutter blades close around the pipe.

When pre-installed in a well system as a part of a rogue hydrocarbon detection, management, and diversion system, control valves 202, 434, 505, (and if present bleed valves 432 and 714) shown in FIGS. 3, 15 and 22 are set to normally open, closing at detection of rogue hydrocarbon presence. These are annular valves which close toward the center of the adaptor around an inside pipe if present. Horizontal or vertical blade iris shutter valve as described in FIG. 26 can be used to construct these valves. Side branch valves 206, 435, and 555 are normally closed, opening at detection of rogue hydrocarbon presence. Side branch valves 206, 435 and 555 are normally closed to prevent legitimate fluids from being diverted and opened when sensors detecting rogue hydrocarbon presence. Bleed valves 432, 594 and 714 if present, are partially closed to allow controlled hydrocarbon release to a diversion branch. A production pipe can also be equipped with a threshold pressure or flow rate activated valve to protect against a hydrocarbon up flow exceeding a safety threshold pressure or flow rate. During production mode, a side branch in adaptor 200 and 500 can be used to relieve annular pressure build up between production casing pipe and production pipe, if a pressure sensor is installed in the sensor assembly in the main branch.

Additional devices can be installed and used to provide information to analysts and decision makers to enable timely and informed decisions. For example, embedded micro sensors, transducers, emitters such as pressure and temperature sensors, chemical sensors, sonic, ultra-sonic, or electromagnetic emitters and transducers can be mixed into an adhesive coating material and painted on well tube surfaces before the tubes are installed into the well. Such devices when installed detect well status and transmit signals to monitoring stations or wireless receivers on an ROV. Alternatively, wired or wireless sensors, emitter, and transducers can be strategically mounted on select well tube locations. These devices mounted in the well can provide information to analysts and decision makers to enable timely and informed decisions.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

We claim:

1. A system for enhancing well safety, the system comprising:
   a well casing pipe equipped with a valve that when closed prevents fluid flow through the well casing pipe, where opening and closing of the valve is controlled based on detection of hydrocarbon within the well casing pipe; and
   a hydrocarbon detector that controls closing of the valve within the well casing pipe, wherein the hydrocarbon detector signals the valve to close based on detection of hydrocarbon within the well casing pipe;
   wherein whenever the hydrocarbon detector detects hydrocarbon within the well casing pipe, the valve immediately closes and remains closed as long as the hydrocarbon detector detects hydrocarbon within the well casing pipe.

2. A system as in claim 1, wherein the valve is a tubal shutter plate check valve.

3. A system as in claim 1, wherein the valve is an iris shutter check valve.

4. A system as in claim 1, wherein the valve is constructed using a shutter plate.

5. A system as in claim 1, wherein the valve is a tubal shutter check valve.

6. A system as in claim 1, wherein the valve is an iris shutter valve that closes inward so that when a drill pipe is located within the well casing pipe, the valve can close by sealing against the drill pipe.

7. A system as in claim 1, the system additionally includes:
   a production pipe within the well casing pipe, the production pipe equipped with a safety valve, which reduces an opening in the safety valve when detecting a flow above a safety threshold, wherein the valve closes by sealing against the production pipe.

8. A system as in claim 1, additionally comprising:
   a pressure sensor that monitors pressure within the well casing pipe, the pressure sensor also controlling closing of the valve.

9. A system for enhancing well safety, the system comprising:
   a well casing pipe; and,
   a valve assembly within the well casing pipe that includes a pressure sensor that detects fluid pressure and a valve that when shut prevents fluid flow within the well casing pipe;
   wherein the valve assembly shuts the valve whenever the pressure sensor senses that pressure exceeds a predetermined threshold; and
   wherein the valve assembly additionally includes a hydrocarbon chemical sensor that monitors presence of hydrocarbon, wherein the valve assembly also shuts the valve whenever the hydrocarbon chemical sensor detects presence of hydrocarbon.

10. A system as in claim 9, the valve is a tubal shutter plate check valve.

11. A system as in claim 9, the valve is an iris shutter check valve.

12. A system as in claim 9, the valve is constructed using a shutter plate.

13. A system as in claim 9, the valve is a tubal shutter check valve.

14. A system as in claim 9, the system additionally includes:
- a drill pipe located within the well casing pipe, the drill pipe equipped with a one-way check valve preventing hydrocarbon up flow into the drill pipe, wherein the valve closes by sealing against the drill pipe.

15. A system as in claim 9, the system additionally includes:
- a production pipe located within the well casing pipe, the production pipe equipped with a safety valve, which reduces an opening in the safety valve when detecting a flow above a safety threshold, wherein the valve closes by sealing against the production pipe.

16. A system for enhancing well safety, the system comprising:
- a well casing pipe; and,
- a valve assembly within the well casing pipe that includes a pressure sensor that detects fluid pressure and an iris shutter valve that when shut seals around an inner pipe within the well casing pipe so as to prevent fluid flow within the well casing pipe;
- wherein the valve assembly shuts the valve whenever the pressure sensor senses that pressure exceeds a predetermined threshold.

17. A system as in claim 16 wherein the inner pipe is a drill pipe.

18. A system as in claim 16 wherein the inner pipe is a production pipe.

19. A system as in claim 16 wherein the valve assembly additionally includes a hydrocarbon chemical sensor that monitors presence of hydrocarbon, wherein the valve assembly also shuts the valve whenever the hydrocarbon chemical sensor detects presence of hydrocarbon.

* * * * *